(12) United States Patent
McCabe

(10) Patent No.: US 8,567,021 B2
(45) Date of Patent: Oct. 29, 2013

(54) METHOD FOR CONSTRUCTING A PRODUCT AND FASTENER THEREFORE

(76) Inventor: Stephen O. McCabe, Los Angeles, CA (US)

( * ) Notice: Subject to any disclaimer, the term of this patent is extended or adjusted under 35 U.S.C. 154(b) by 665 days.

(21) Appl. No.: 12/658,685

(22) Filed: Feb. 13, 2010

(65) Prior Publication Data

US 2011/0197407 A1    Aug. 18, 2011

(51) Int. Cl.
*A42B 3/32*        (2006.01)

(52) U.S. Cl.
USPC ............ 24/586.11; 2/410; 2/200.1; 2/209.11; 29/453

(58) Field of Classification Search
USPC .......... 24/662, 681, 586.11, DIG. 41; 446/27, 446/109, 111–113, 116, 120–123; 2/410, 2/6.6, 417, 422, 171, 171.1, 209.11, 2/200.1–200.3; 29/453, 454
See application file for complete search history.

(56) References Cited

U.S. PATENT DOCUMENTS

| | | | |
|---|---|---|---|
| 2,648,110 A | 8/1953 | Baskind | |
| 2,791,868 A * | 5/1957 | Reidar Viken | ................ 446/107 |
| 3,213,507 A | 10/1965 | Christian et al. | |
| 3,270,943 A | 9/1966 | Polenghi | |
| 3,349,451 A | 10/1967 | Maeno | |
| 3,551,963 A * | 1/1971 | Mosher, Jr. et al. | ............ 24/618 |
| 3,693,494 A | 9/1972 | Meyer | |
| 3,777,052 A | 12/1973 | Fegen | |
| 3,803,670 A | 4/1974 | Johnson | |
| 3,836,703 A | 9/1974 | Coules | |
| 3,869,766 A | 3/1975 | Raymond | |
| 3,893,208 A | 7/1975 | Yuda | |
| 3,909,883 A | 10/1975 | Fegen | |
| 3,979,802 A | 9/1976 | Bongartz | |
| 4,097,930 A | 7/1978 | Bay | |
| 4,112,815 A | 9/1978 | Tanaka | |
| 4,143,577 A | 3/1979 | Eberhardt | |
| 4,183,121 A | 1/1980 | Cousins | |
| 4,200,900 A | 4/1980 | McGeorge | |
| 4,297,769 A | 11/1981 | Coules | |
| 4,397,061 A | 8/1983 | Kanzaka | |
| 4,577,376 A | 3/1986 | Clendinen | |
| 4,629,356 A | 12/1986 | Hayashi | |
| 4,796,339 A | 1/1989 | Burke | |
| 4,926,759 A | 5/1990 | Vitsky et al. | |
| 5,050,279 A | 9/1991 | Nemazi et al. | |
| 5,214,800 A | 6/1993 | Braun | |
| 5,615,414 A * | 4/1997 | Landis | ................................ 2/12 |
| 5,634,210 A | 6/1997 | King et al. | |
| 5,647,107 A | 7/1997 | Brewster | |
| 5,797,784 A | 8/1998 | Wolfe | |
| 6,233,782 B1 | 5/2001 | Regele et al. | |
| 6,353,978 B1 | 3/2002 | Kawahara et al. | |
| 6,374,455 B1 | 4/2002 | Regele et al. | |

(Continued)

*Primary Examiner* — James Brittain

(74) *Attorney, Agent, or Firm* — John S. Christopher

(57) ABSTRACT

A method for constructing a product comprising the steps of: providing a plurality of component parts fashioned from a flexible substrate material and having a flat profile when disassembled; forming apertures in the component parts to establish fastening points for facilitating product assembly, where each aperture has a single-component snap fastener mounted therein; integrally molding each snap fastener to include a female section and a male section; assembling the component parts by removably stackably affixing the fastener male sections of a first component part to the fastener female sections of a second component part, to form a self-supporting, three-dimensional product exoskeleton having flexibly curved surfaces; and returning the component parts to a flat profile upon disengaging the snap fasteners from the product.

9 Claims, 10 Drawing Sheets

(56) References Cited

U.S. PATENT DOCUMENTS

| | | |
|---|---|---|
| 6,588,367 B1 | 7/2003 | Mac Manus |
| D500,802 S | 1/2005 | DeCarlo et al. |
| 6,941,582 B2 | 9/2005 | Miska |
| 7,237,819 B2 | 7/2007 | Fox et al. |
| D567,592 S | 4/2008 | Fite, IV et al. |
| D571,162 S | 6/2008 | Fite, IV et al. |
| 2006/0124642 A1 | 6/2006 | Karow et al. |

* cited by examiner

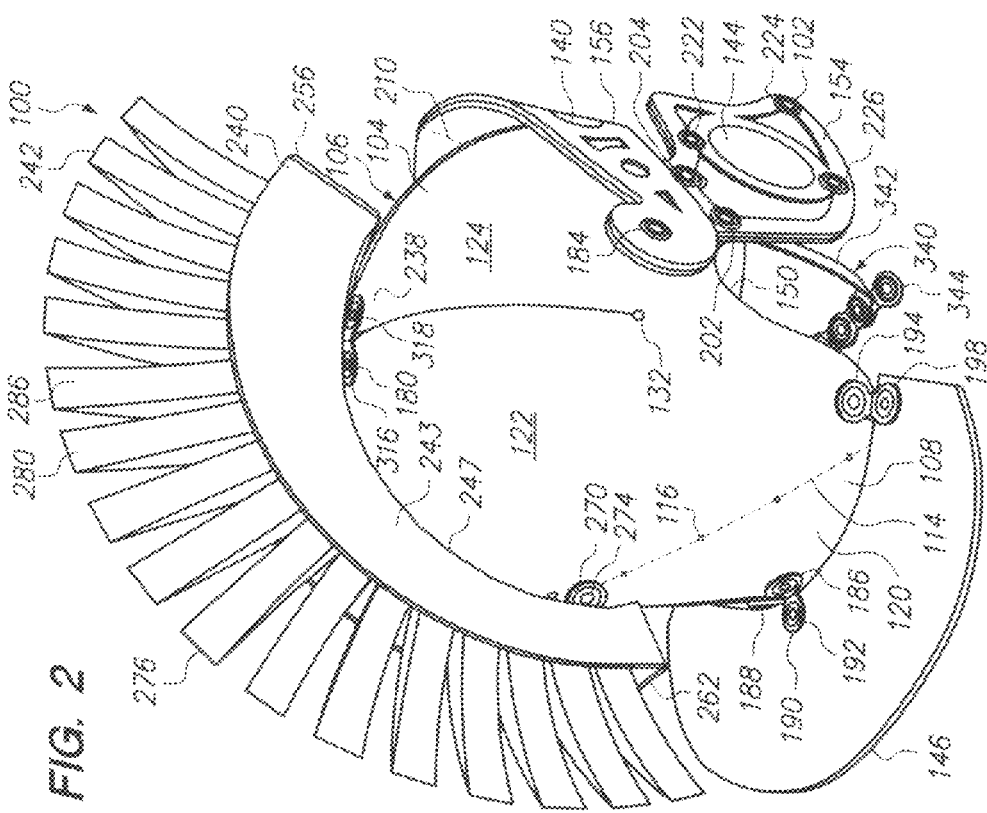
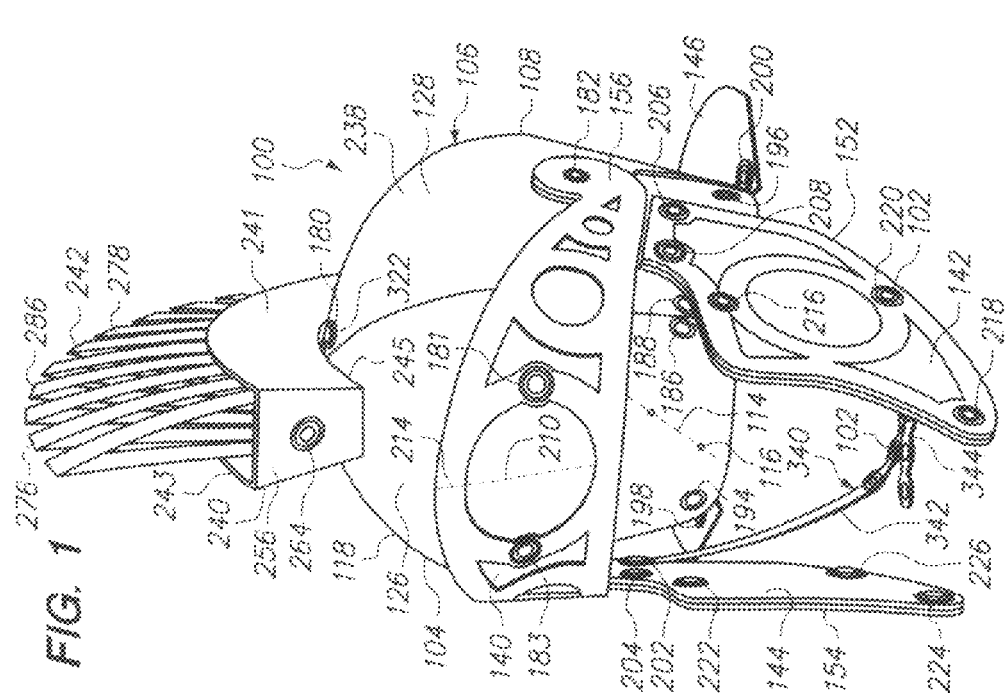

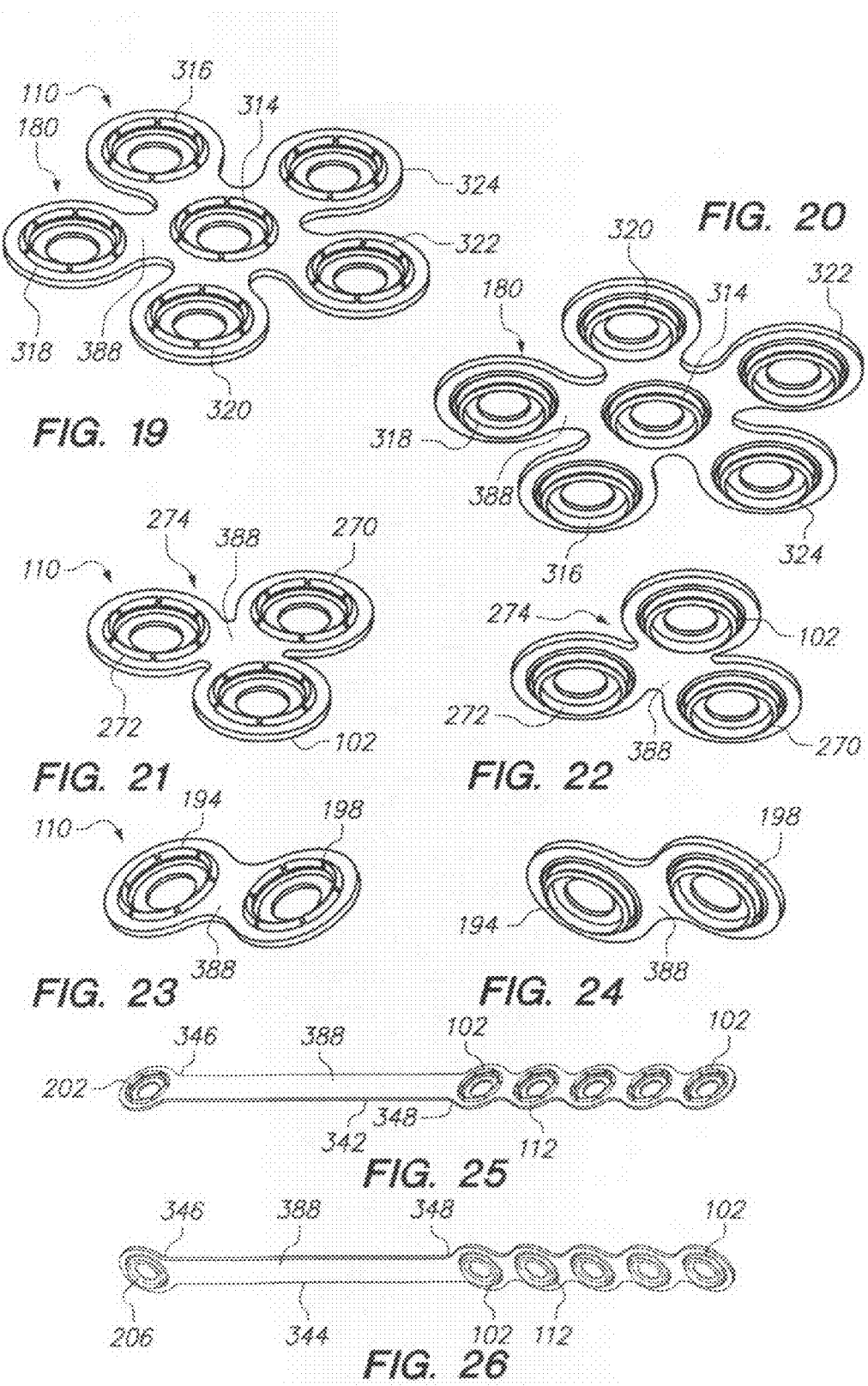

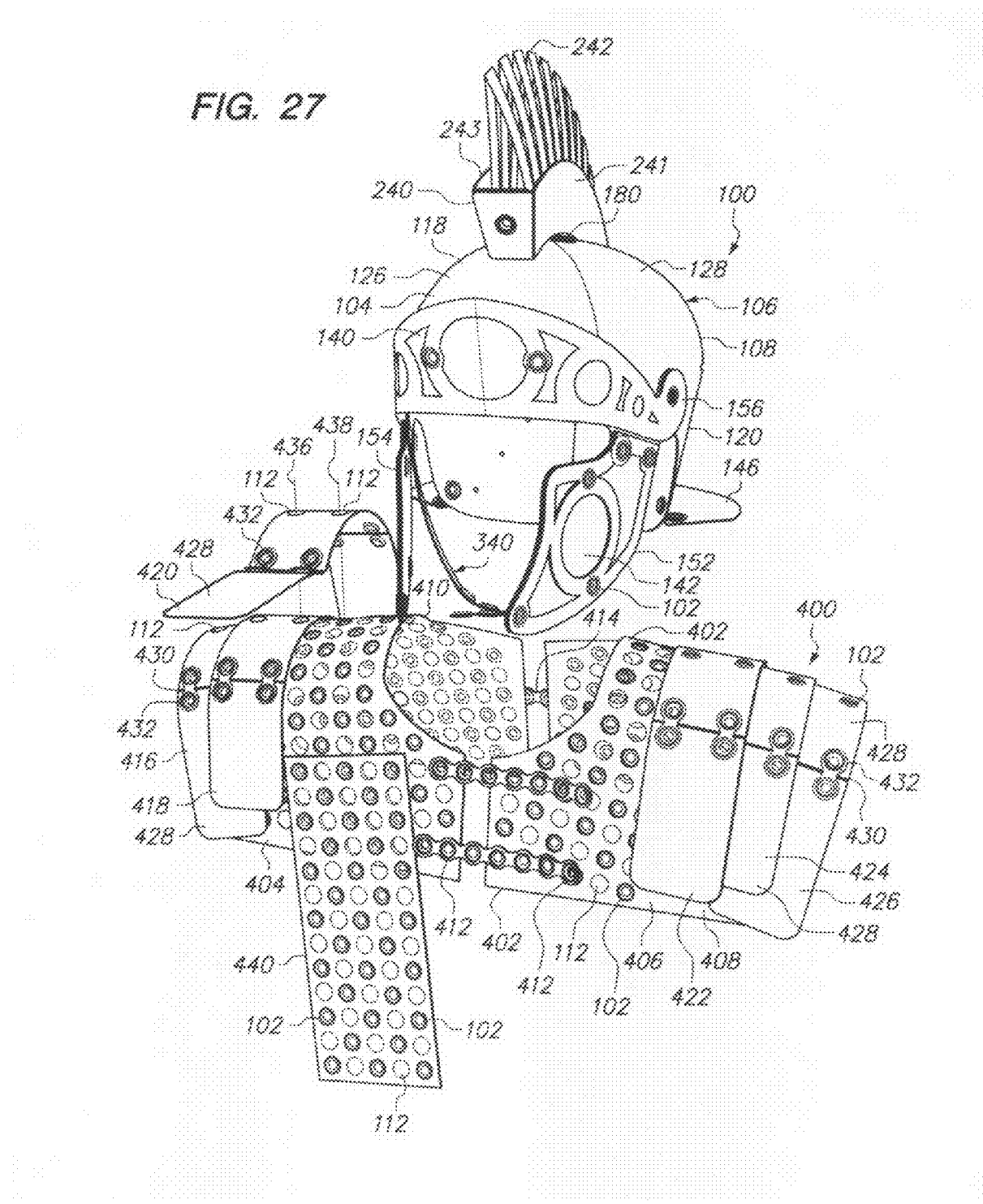

METHOD FOR CONSTRUCTING A PRODUCT AND FASTENER THEREFORE

BACKGROUND OF THE INVENTION

1. Technical Field

The present invention relates to a method for constructing a product. More specifically, the present invention relates to methods and apparatus for constructing a product comprising multiple components fashioned from flexible polypropylene patterns which when assembled with a plurality of integrally-molded, single-component snap fasteners form a three-dimension, self-supporting, flexible exoskeleton structure, the components returning to an original flat profile when the product is disassembled.

2. Background Art

Products have been fabricated, constructed and assembled by many different methods in the past using varied construction materials and fastening techniques. The construction materials and fastening methods were typically selected based upon the intended use of the products. For example, products intended to be used to support the weight of adults or products that were intended to carry a heavier mechanical load would be fashioned from stronger and more robust materials than those products intended for use by children.

Further, some products are constructed with the intention of being permanently assembled while other products are constructed with removable fasteners so that they can be assembled and disassembled at will. An example of this construction method includes U.S. Pat. No. 4,926,759 to Vitsky et al. in 1990. Vitsky et al. disclose a product identified as knockdown furniture which is described as household furniture that is easily assembled and disassembled. The described furniture is specifically directed to furniture which is scaled in size and in assembly complexity for use by children. An embodiment presented by Vitsky et al. disclose a furniture package that is provided with full child-size parts and with a smaller sized set of paper or cardboard parts matching the child-sized parts. This embodiment enables the child to visualize the completed furniture pieces as well as the assembly process.

The drawing illustrations and disclosure presented by Vitsky et al. show side members that are preferably generally planar or include one or more planar surfaces which are preferably generally vertical surfaces. The surfaces of Vitsky et al. are disposed horizontally, vertically or at angles and are not, in general, curved. The side frame members have preformed apertures therein disposed to accept tabbed extensions of central members which may be placed between one or more side members. Vitsky et al. further represents overlying mating apertures for receiving large fasteners that are easily manipulated by young children. The components of the knockdown furniture are not fabricated into specific patterns which are held under stress by the fastener connectors for enabling the formation of components having curved surfaces.

In an example directed to the assembly of a chair, Vitsky et al. discloses first forming the central element to the general shape of a chair seat and back portions and inserting tabs into slots of a first side piece and then repeating the tab insertion procedure for the second side piece. Assembly is completed by folding a central element tabs over at the site of the mating side piece fastener holes, then inserting an expandable fastener through both tab fastener holes and side piece fastener holes. This procedure is repeated until all the fastener hole pairs are secured by fasteners. Vitsky et al. shows an example expandable fastener for use with the knockdown furniture which comprises generally a first part in the shape of a head or flange having extended therefrom a radially expandable central protrusion split into at least two sections to form a resilient end portion. The resilient end portion can be tapered to facilitate placement of the fastener into the openings of the end pieces.

In another example, U.S. Pat. No. 4,097,930 issued to Bay in 1978 discloses a snap-on shield for a helmet. The snap-on shield comprises a flat transparent surface which can be shaped to fit onto the helmet, or a molded pre-curved surface, to protect the face of a wearer. The shield is injection-molded of a polymer material having a molded female center snap portion for engaging a male snap portion on the helmet and a pair of groups of female polymer snaps are molded for one snap portion to engage each male ear stud snap on the helmet. Each group of female snap portions is positioned so that one snap portion fits the ear stud male snap portion of at least one helmet. The shield may also have additional male snap portions molded therein for engaging female snaps on a visor. The face shield with snap fastener portions is molded in one piece to fit a large variety of helmets having variations in the positioning of the helmet snap fastener portions thereon.

In the '930 patent to Bay, a face shield is adapted to be attached to a helmet, and a visor is adapted to be attached to the front of the shield. The shield and the visor can be comprised of a polymer material and the snap fasteners can be fabricated from a plastic material. Although the face shield and visor components are attached to the helmet, the polymer material forming the components does not exhibit spring-like properties which causes a components initial flat profile when disassembled to adopt a three-dimensional exoskeleton structure when assembled. The present design of the snap fasteners utilized by the Bay '930 patent are fashioned from multiple structural elements and thus are not single component snap fasteners. Consequently, the method for constructing the helmet shield apparatus of Bay '930 requires more components requiring more construction steps and is less economical.

It is further noted that mechanical snap fasteners of the prior art are typically manufactured to include four basic components. Those components include a male component and a separate female component. Additionally, the male component of the snap fastener includes a rear fitting cap positioned on the opposite side of the fabric of a garment in relation to the male component. Likewise, the female component of the snap fastener also includes a rear fitting cap positioned on the opposite side of the fabric of the garment in relation to the female component. Also, the male component is independent of the female component. This prior art construction does not emulate a single component snap fastener exhibiting an integrally molded form and having a male section and a female section each of which are compatible with all other identical snap fasteners.

Thus, there is a need in the art for a method for constructing a product which comprises multiple structural components fashioned from flexible polypropylene patterns having spring-like properties, the components initially exhibiting a flat profile being assembled with a plurality of integrally molded, single-component snap fasteners to fabricate a three-dimensional, self-supporting, flexibly-curved exoskeleton structure, the components returning to the original flat profile when the product is disassembled by disengaging the single-component snap fasteners.

DISCLOSURE OF THE INVENTION

Briefly, and in general terms, the present invention provides a new and improved method for constructing a product and a mechanical fastener for use therewith. The method is typically utilized for constructing a product that comprises multiple structural components that are fashioned from flexible substrate material patterns that exhibit spring-like properties such as, for example, polypropylene. It is noted that the flexible substrate material patterns that form the individual components of the subject product typically exhibit a flat profile when disassembled.

The flexible nature of the substrate material patterns enable the product to be assembled with novel mechanical fasteners that result in a three-dimensional exoskeleton structure. The three-dimensional exoskeleton structure includes flexibly-curved surfaces which are assembled by utilizing a plurality of integrally-molded, single-component snap fasteners resulting in a self-supporting structure. However, when the three-dimensional exoskeleton structure is disassembled, the individual components of the subject product are transformed from the three-dimensional exoskeleton structure to the previous mentioned flat profile.

In a preferred embodiment, the method for constructing a product includes the steps of designing a helmet base comprising a plurality of base segments where each of the base segments are formed on a common substrate sheet of flat, flexible polypropylene material having flexible, spring-like properties. Each of the base segments includes a segment tongue for connection purposes. A further step includes modifying the helmet base to include a plurality of apertures, fold lines and stress release holes for enabling the helmet base to be formed into a desired shape. Thereafter, the step of manipulating the common substrate sheet of polypropylene material is undertaken to form a ring-shape and to position each of the segment tongues to be affixed to a first multi-fastener connection tab. The first multi-fastener connection tab serves to connect to each of the separate segment tongues for forming a three-dimensional exoskeleton of a helmet.

Further steps in the preferred embodiment of the method for constructing a product include the mounting of additional components to the helmet base including a decorative plume affixed to the first multi-fastener connection tab, a rear neck guard affixed with a second multi-fastener connection tab, and a visor, a pair of cheek guards, and an adjustable chin strap each affixed with single-component snap fasteners. The adjustable chin strap comprises a first strap and a second strap, each including a plurality of apertures formed therein with a single component snap fastener mounted in each individual aperture. The multiple snap fasteners mounted in each aperture of the first strap and second strap provide the adjustability feature to the chin strap.

The joining of the multiple structural components is accomplished by the step of mounting one of the integrally formed, single-component snap fasteners within each of the apertures formed within the component parts for facilitating the assembly of the helmet. Each of the snap fasteners comprises a female section and a male section, each integrally molded to and supported by a fastener body. The female section includes a ring-shaped sloped rim including a plurality of slots for providing flexibility to the sloped rim. Further, the sloped rim defines an interior indentation ring. A top indentation ring is formed between the sloped rim and the fastener body for defining a retaining jaw which is employed for clamping to the substrate material when the sloped rim is inserted through an aperture formed within the substrate material. The male section of the snap fastener includes a ring-shaped protuberance extending from the fastener body where the ring-shaped protuberance defines a bottom indentation ring. The combination of the female section, the male section and the fastener body form a single-component snap fastener. The assembly of the component parts utilizing the snap fasteners is enabled by the fact that any snap fastener is stackably engageable and disengageable with any other identical snap fastener.

The present invention is generally directed to a method for constructing a product comprising the steps of: providing a plurality of component parts of a product fashioned from a substrate material having flexible, spring-like properties, where each component part has a flat profile in a disassembled state; forming a plurality of apertures in each of the component parts to establish a corresponding plurality of fastening points for facilitating assembly of the product, where each of the apertures has a single-component snap fastener mounted therein; integrally molding each of the single-component snap fasteners to include a female section and a male section; assembling each of the component parts of the product by removably affixing the male sections of the snap fasteners mounted within a first of the component parts stackably with the female sections of the snap fasteners mounted within a second of the component parts, to form a self-supporting, three-dimensional exoskeleton of the product having flexibly curved surfaces; and returning the plurality of component parts to a flat profile upon disengaging the snap fasteners.

In an additional feature, the inventive method is directed to constructing a helmet as described in combination with a fastener matrix. The fastener matrix can be fashioned form a sheet of flexible material such as, for example, polyvinylchloride. Just as the substrate material forming the component parts, the flexible material of the fastener matrix includes a plurality of apertures formed therein with a single-component snap fastener mounted in each aperture. The pattern of the matrix of fasteners can be customized for a particular product being constructed. The pattern of snap fasteners mounted in the fastener matrix of the flexible material are stackably engageable and disengageable with identical snap fasteners mounted in other component parts, such as, for example, body armor, to be attached to the fastener matrix.

These and other objects and advantages of the present invention will become apparent from the following more detailed description, taken in conjunction with the accompanying drawings which illustrate the invention, by way of example.

BRIEF DESCRIPTION OF THE DRAWINGS

FIG. 1 is a front perspective view of an embodiment of a toy helmet showing a helmet base having a comb and plumb mounted thereon for illustrating an inventive method for constructing a product and the fasteners utilized therewith.

FIG. 2 is a rear perspective view of the toy helmet of FIG. 1 showing a rear neck guard affixed to the helmet base for further illustrating the inventive method for constructing a product and the fasteners utilized therewith.

FIG. 19 is a top perspective view of a six fastener connection tab for use with the toy helmet of FIG. 1 showing the female sections of six separate snap fasteners utilized in the inventive method for constructing a product.

FIG. 20 is a bottom perspective view of a six fastener connection tab for use with the toy helmet of FIG. 1 showing the male sections of six separate snap fasteners utilized in the inventive method for constructing a product.

FIG. 21 is a top perspective view of a three fastener connection tab for use with the toy helmet of FIG. 1 showing the female sections of three separate snap fasteners utilized in the inventive method for constructing a product.

FIG. 22 is a bottom perspective view of a three fastener connection tab for use with the toy helmet of FIG. 1 showing the male sections of three separate snap fasteners utilized in the inventive method for constructing a product.

FIG. 23 is a top perspective view of a two fastener connection tab for use with the toy helmet of FIG. 1 showing the female sections of two separate snap fasteners utilized in the inventive method for constructing a product.

FIG. 24 is a bottom perspective view of a two fastener connection tab for use with the toy helmet of FIG. 1 showing the male sections of two separate snap fasteners utilized in the inventive method for constructing a product.

FIG. 25 is a top perspective view of a chin strap of the toy helmet of FIG. 1 showing the female sections of six snap fasteners utilized in the inventive method for constructing a product.

FIG. 26 is a bottom perspective view of a chin strap of the toy helmet of FIG. 1 showing the male sections of six snap fasteners utilized in the inventive method for constructing a product.

FIG. 27 is a perspective view of a shoulder matrix for use with the toy helmet of FIG. 1 showing a sheet of flexible material fashioned to fit the human shoulder and comprising a pattern of apertures with a plurality of fasteners mounted therein.

DETAILED DESCRIPTION OF THE INVENTION

Figure 3:
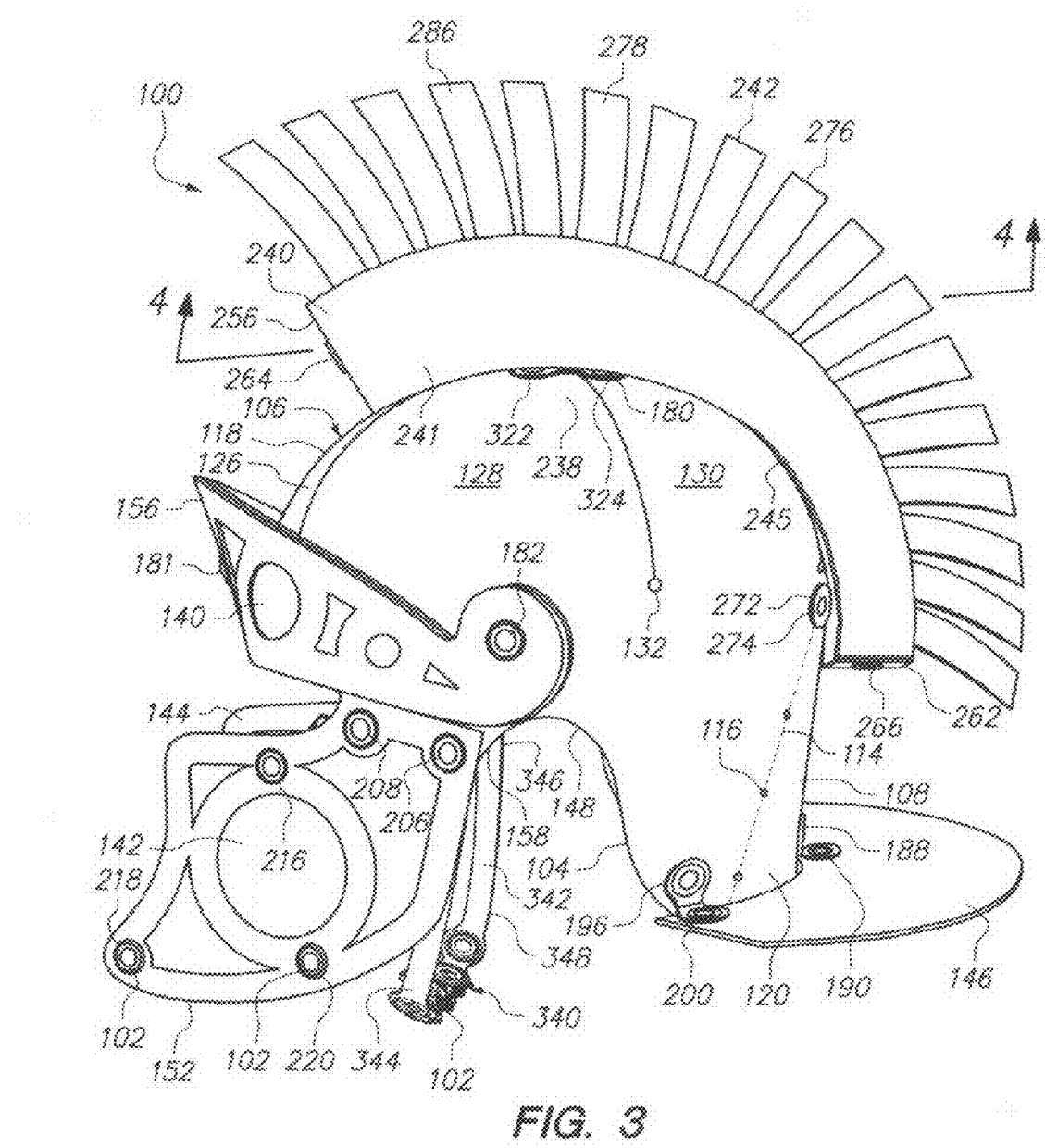
FIG. 3 is a side elevation view of the toy helmet of FIG. 1 showing the comb and plumb and the rear neck guard and also showing a visor and cheek guards for further illustrating the method for constructing a product and the fasteners utilized therewith.

The present invention relates to a method for constructing a product 100 and a fastener 102 utilized therewith as shown in FIGS. 1-27. The product 100 comprises a plurality of components fashioned from synthetic compounds and exhibiting a flat profile in the disassembled state. The preferred fastener 102 is an integrally molded, single-component snap fastener that can be repeatedly engaged with and disengaged from any other identical snap fastener utilized in the product 100. The plurality of components of the product 100 when assembled with a plurality of the integrally-molded, single-component snap fasteners 102 form a three-dimensional, self-supporting, flexible exoskeleton structure 104. Upon disassembly of the exoskeleton structure 104 of the product 100 by disengaging the snap fasteners 104, the component parts return to the original flat profile for transport or storage.

Figure 5:
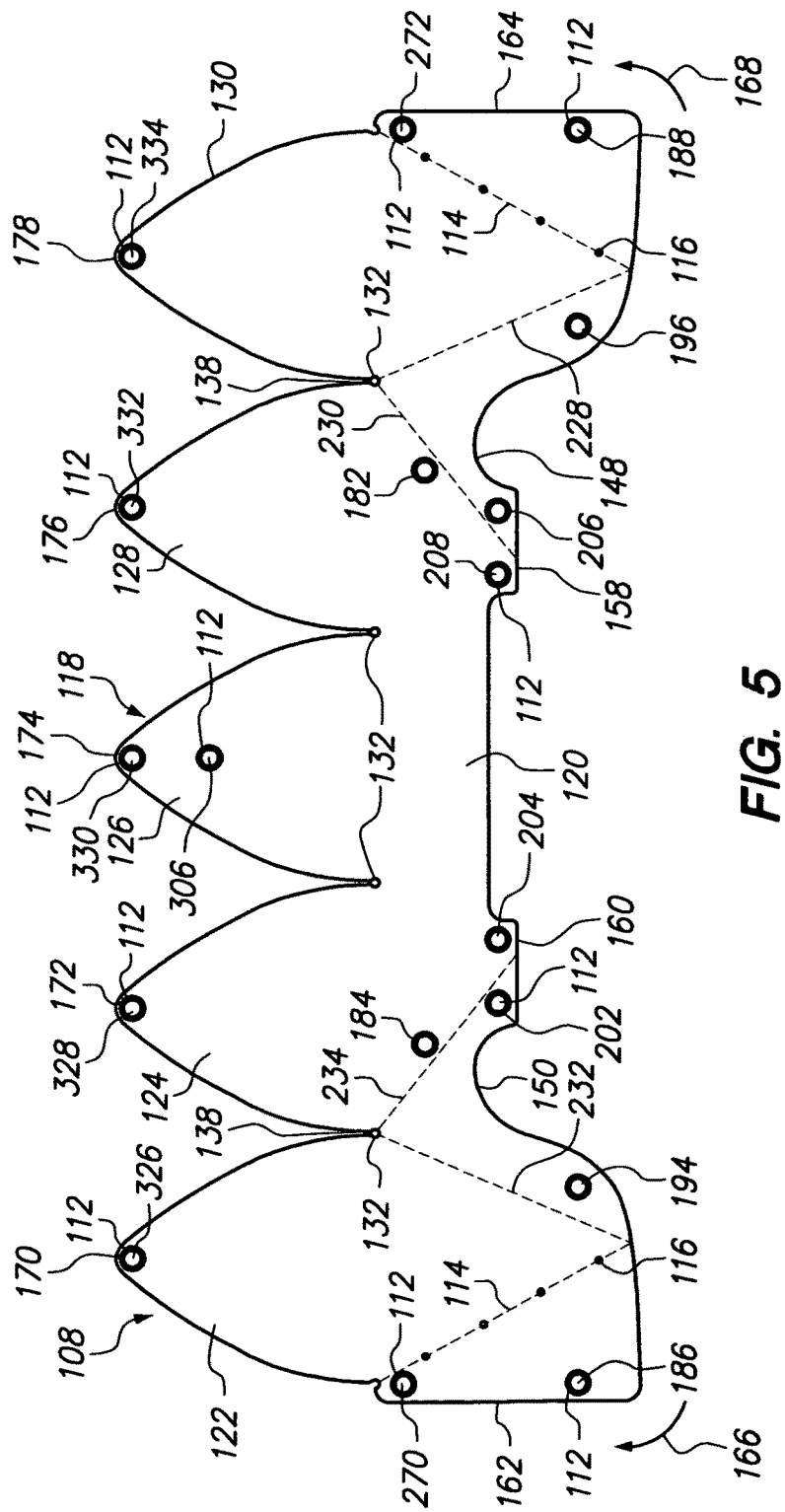
FIG. 5 is an unassembled flat planar view of the base of the toy helmet of FIG. 1 showing a plurality of segments including fold lines and stress release holes associated therewith, and a plurality of apertures formed there through for illustrating the method for constructing a product and the fasteners utilized therewith.

In a preferred embodiment, the product 100 chosen as the exemplary embodiment is a Roman style helmet 106 typically worn by a person (not shown). The helmet 106 is illustrated most clearly in FIGS. 1-3 and the primary structural component of the helmet 106 is a helmet base 108 as shown in FIG. 5. As will be described herein below, all other structural components are removably attached to the helmet base 108 by employing individual integrally molded, single-component snap fasteners 102 in a stackable manner as shown in FIGS. 13-18, or by use of one of a plurality of fastener connection tabs 110 as shown in FIGS. 19-24. Further, it is noted that the helmet base 108 includes a plurality of apertures 112, fold lines 114 and stress release holes 116 shown in FIGS. 1-3 but best shown in FIG. 5 for enabling the helmet base 108 to be formed and manipulated into a desired shape.

Assembly of the helmet base 108 and the removable attachment of the plurality of components of the helmet 106 requires that the helmet base 108 and the plurality of components be fashioned from a substrate material which is flexible and exhibits spring-like properties. This is because that upon assembly, the helmet base 108 and the plurality of components are transformed from a flat profile to a three-dimensional, self-supporting exoskeleton structure 104. In the preferred embodiment, the flexible substrate material selected for use in fabricating the helmet base 108 and most of the component parts of the helmet 106 is polypropylene. It is noted that the integrally molded, single-component snap fasteners 102 can be fabricated form any of several synthetic materials including polyester and nylon.

It is significant to briefly visit the engineering technical aspects of flexible structures in the scientific literature as they relate to the formation of exoskeletons and the characteristics of polypropylene. As the helmet base 108 as shown in FIG. 5 is assembled utilizing the integrally molded, single-component snap fasteners 102, a self-supporting, three-dimensional exoskeleton structure 104 of the Roman style helmet 106 emerges. The method utilized to construct the exoskeleton structure 104 incorporates the principles of deformation mechanics. Deformation is defined as a change in shape of a structure due to an applied force. This can be a result of tensile (pulling) forces, compressive (pushing) forces, shear, bending or torsion (twisting) forces. Deformation is often described in terms of strain. For example, if compressive loading forces are applied to the helmet 106, deformation results so that the original shape of the helmet 106 changes, i.e., deforms, to one of, for example, bulging sides of the helmet base 108. The sides bulge because the material, although strong enough not to crack or otherwise fail, is not strong enough to support the load without change. Thus, the material comprising the sides of the helmet 106 is forced laterally outward.

Deformation may be temporary, as a spring returns to its original length when tension is removed, or permanent as when an object is irreversibly bent or broken. This concept is described by the two-dimensional Cartesian graph having Strain as the horizontal coordinate and Stress as the vertical coordinate. The graph presents a linear straight line through an "Elastic region" where increased levels of Stress results in proportional increased levels of Strain. The curve is reduced in slope in the "Plastic region" where very little increase in Stress results in large increases in Strain, until the "Fracture" point is reached and the curve levels off. At the fracture point, the material forming the helmet 106 cannot recover and it is permanently damaged.

Depending on the type of material, size and geometry of an object or product, and the forces applied, various types of deformation may result. For example, elastic deformation is reversible, meaning the when the forces are no longer applied, the object of product returns to its original shape. As the name implies, elastic (rubber) has a rather large elastic deformation while crystals and hard thermosetting plastics undergo almost no elastic deformation. Elastic deformation is governed by Hooke's Law which states in words that the applied stress is equal to a material constant called Young's modulus times the resulting strain, and Young's modulus is equal to the slope of the curve. This relationship only applies in the elastic range of the curve and indicates that the slope (rise/run) of the stress vs. strain curve can be used to find Young's modulus.

The elastic range ends when the material reaches its yield strength at which point plastic deformation begins. Plastic deformation is not reversible. However, an object or product in the plastic deformation range will first have undergone elastic deformation which is reversible. Thus, the object or product will return part way to its original shape. Often thermoplastics have a rather large plastic deformation region as do ductile metals such as copper, silver and gold. Another deformation mechanism is metal fatigue which occurs primarily in ductile metals. It was originally thought that a material deformed only within the elastic range returned completely to its original state once the forces were removed. However, faults are introduced at the molecular level with each deformation. After many deformations, cracks will begin to appear, followed soon thereafter by a fracture, with no apparent plastic deformation in between. Depending on the material, shape and how close to the elastic limit it is deformed, many material deformations may be required.

Metal fatigue is a major cause of aircraft failure. Ultimate failure of a part by metal fatigue can be determined by (a) predicting failure due to the material/force/shape/iteration combination and replacing the suspect material parts before metal fatigue occurs, or (b) by performing inspections to detect the microscopic cracks and replace them once the cracks occur. Selection of materials which are not likely to suffer from metal fatigue during the life of the product is the best solution. Avoiding shapes with sharp corners limits metal fatigue by reducing stress concentrations but does not limit it. Fracture deformation is not reversible. A break occurs after a material has reached the end of the elastic, and then plastic, deformation ranges. At this point, forces accumulate until they are sufficient to cause fracture. All materials will eventually fracture, if sufficient force is applied.

The three-dimensional, self-supporting exoskeleton structure 104 shown in FIGS. 1-3 of the present invention relates to thin shell structures. A thin shell structure is a light weight construction using shell elements. These elements can be, for example, curved and assembled large structures. Typical applications include fuselages of aeroplanes, boat hulls and roof structures in buildings. A thin shell is defined as a shell with a thickness which is relatively small compared to its other dimensions and in which deformations are not large compared to thickness. A primary difference between a shell structure and a plate structure is that, in the unstressed state, the shell structure has curvature as opposed to plate structures which are flat.

The properties of the polypropylene material utilized in the present invention include elastic deformation memory, that is, that portion of the stress vs. strain curve in which the object or product returns to its original shape once the deformation forces are no longer applied. Those components fabricated from polypropylene material attempt to maintain a flat profile when the load is removed. In this manner, the polypropylene components acts somewhat like a linear flex spring. Furthermore, a cantilever spring operates like a second class lever. In a second class lever, the input effort force is located at a first end of a bar and the fulcrum is located at a second opposite end of the bar. The output load is located at a point between the input force and the fulcrum. As it relates to the polypropylene helmet base 108, the fulcrum is located at a fixed end and the input force is located at the opposite end of the spring-like polypropylene component. The output of the spring-like polypropylene component is between the fixed fulcrum and the input force on the component part resulting in a bowed curved surface. However, the polypropylene component part attempts to maintain a flat profile when the input force is removed, meaning that when the integrally-molded, single-component snap fasteners 102 are disengaged, the polypropylene component parts return to their original flat profile.

The exoskeleton structure 104 as shown in FIGS. 1-3 is a flexible shell structure where the integrity is maintained in two different ways. The integrity of the exoskeleton structure 104 can be maintained by harnessing the opposing spring forces utilizing the self-supporting, single-component snap fasteners 102 which bonds the opposing spring forces. These bonds of the opposing spring forces cause the exoskeleton structure 104 to stay erect by pulling against one another forming an equilibrium state, i.e., the spring forces associated with the fixed end of the polypropylene helmet base 108 as opposed to the spring forces associated with the fastened end typically at one of a plurality of segments 118 shown best in FIG. 5. The second way to maintain the integrity of the exoskeleton structure 104 is by using two layers in relation to several component parts of the helmet 106. The two layers utilize an inner layer and an outer layer where one layer constricts the other layer which results in the formation of a stiffening bow structure. In either case, the polypropylene material must be secured by the snap fasteners 102 to maintain the exoskeleton structure 104. Additionally, the shape of the polypropylene material, particularly of the helmet base 108, determines where the linear flex spring can be formed. The pattern of the cut of the polypropylene material of the helmet base 108 is intrinsic to its mechanics which are responsible for maintaining the rigid form. The pattern of the cut of the polypropylene material refers to the plurality of segments 118 and the combination of the apertures 112, fold lines 114, and stress release holes 116 that form, in particular, the helmet base 108 as shown in FIG. 5, as do all other components shown in the drawing Figs. of the present invention.

Relating to the assembly of the helmet 106, the attachment points are those locations on the base helmet 108 that are selected to insert the snap fasteners 102 for securing together the component parts of the three-dimensional, self-supporting exoskeleton structure 104. Thus, the pattern of attachment points will disclose the situs of each snap fastener 102. By securing the plurality of components of the helmet base 108, particularly the plurality of segments 118 with the snap fasteners 102, the integrity of the exoskeleton structure 104 can be maintained by harnessing the opposing flexible spring forces to achieve a state of equilibrium. The plurality of attachment points of the snap fasteners 102 also have the freedom to pivot which enables adjustment in the direction of the flexible spring forces if the exoskeleton structure 104 is further deformed. It is also important to distinguish between the number of snap fasteners 102 employed and the number of attachment points or connection points on the exoskeleton structure 104. For example, a single attachment point located on the exoskeleton structure 104 may connect a plurality of component parts of the helmet 106. Each component part includes a plurality of the apertures 112 formed therein and each aperture 112 typically includes a snap fastener 102 mounted therein. The apertures 112 of two or more component parts can be aligned and their snap fasteners 102 be connected in-tandem with one another. Multiple snap fasteners 102 might be involved in the connection, however, the in-tandem connection results in only a single attachment or connection point.

It is noted that the inherent characteristics of polypropylene material are exploited to the advantage of the inventive method of the present invention. The flexibility and spring-like character of the polypropylene material when secured with the snap fasteners 102 is a main feature of the present invention. The term Tensegrity (pronounced as ten.sig.ri.ty) describes this concept which has been defined in the following manner. Tensegrity refers to the property of skeleton structures that employ continuous tension members and discontinuous compression members in such a way that each member operates with the maximum efficiency and economy. The flexible and spring-like properties of the polypropylene material when fastened are exploited to the benefit of the inventive method. Thus, when the snap fasteners 102 are employed, the memory of the polypropylene material provides the "pushing" force (continuous tension member in an effort to recover its shape). In distinction, the snap fasteners 102 provide the "pulling" force (discontinuous compressive member) when holding the component parts together. The three-dimensional, self-supporting exoskeleton structure 104 results when an equilibrium is achieved between the competing "pushing" and "pulling" forces.

Securing the polypropylene material with the minimum number of snap fasteners 102 required enables the exoskeleton structure 104 to (a) collapse, but not to fracture, when under a mechanical load sufficient to cause collapse, but also (b) to rebound and recover its original shape that existed prior to the application of the mechanical load. It is noted that some manual manipulation may be required in order to facilitate full recovery of the original shape of the exoskeleton structure 104. Again, the snap fasteners 102 function as pivots and assist in the process of reshaping the exoskeleton structure 104 by enabling the components to move with respect to one another. Thus, the exoskeleton structure 104 is (1) sufficiently strong to be self-supporting, (2) has sufficient flexibility to severely deform under load, and (3) is simultaneously flexible enough to be manipulated back into its original shape. This feature is a direct result of the flexible and spring-like properties exhibited by the polypropylene material for constructing the helmet 106 of the present invention.

Let us now turn to the explanation of the specific structure of the inventive helmet 106 as presented in FIGS. 1-12. It is important to note that the method of constructing the exemplary product 100 illustrated in FIGS. 1-3 begins with the plurality of components each exhibiting a "flat profile". Once the product 100 is constructed, it is transformed into the three-dimensional, self-supporting exoskeleton structure 104. However, upon disassembly of the product 100 as by disengaging the snap fasteners 102, each of the components returns to a "flat profile" which is convenient for transport and storage. In the exemplary embodiment, the product 100 is shown as the Roman style helmet 106. The Roman style helmet 106 has been selected from several available prototypes because it is comprised from a plurality of components, employs the integrally-molded, single-component snap fasteners 102, and utilizes each of the steps in the method of construction. It is emphasized that the inventive features of the present invention is not directed to any particular helmet. The invention is directed to the method of constructing the product 100 which can be utilized to construct any helmet shape, furniture such as a chair, medical product such as an arm sling or limb support, child's playhouse or igloo, or even an exterior vehicle body. Virtually any structure having multiple components which can be assembled utilizing the snap fastener 102 can be constructed by the present method.

The helmet 106 is shown in FIGS. 1-3 in perspective and side elevation views of which the main component is the helmet base 108. The helmet base 108 is shown in plan format in FIG. 5 as disclosing a pattern cut in such a manner that when wrapped in a ring or circle and fastened upon itself, would fit on the head of a person (not shown) wearing the helmet 106. The helmet base 108 includes a baseline area 120 with the plurality of five helmet segments 118 extending there above. Specifically, the five helmet segments include a first segment 122, a second segment 124, a third segment 126, a fourth segment 128, and a fifth segment 130. The five helmet segments 122, 124, 126, 128, 130 create a five sided dome that forms the base of the helmet 106. It is noted that the helmet base 108 includes the plurality of apertures 112 as is clearly shown in FIG. 5. Each of the apertures 112 serves as a situs to mount a snap fastener 102 utilized in the assembly of the helmet 106 which will be described in more detail herein below. The helmet 106, helmet base 108 and the plurality of components (with the exception of the snap fasteners 102) are comprised of polypropylene material which provides flexible, spring-like properties.

The fold lines 114 and the stress release holes 116 are important features in the present invention and are clearly shown in FIGS. 1-3 and FIG. 5. The stress release holes 116 serve to release the stress created between a fold line 114 and the baseline area 120. A second type of hole designed to release stress is a segment release inlet 132 which is circular in shape and is intended to release the stress at the interface of two contiguous segments 118 and the baseline area 120. The fold lines 114 reinforce the baseline area 120 as a result of closing the helmet base 108 upon itself. The fold lines 114 in conjunction with the stress release holes 116 weaken the polypropylene material of the helmet base 108 sufficiently to enable the memory of the polypropylene material to be softened. In particular, the fold lines 114 stiffen the polypropylene material in the direction of the fold. Then, the stress release holes 116 soften the memory of the polypropylene material in the area surrounding the stress release hole 116. A linear string of the stress release holes 116 (as shown in FIGS. 2, 3, 5, and 7) in combination with the fold lines 114 provide the following effect. The fold line 114 terminates at the stress release hole 116 where the stiffening from the fold line 114 is released. Thus, the combination of the fold lines 114 and stress release holes 116 enable the polypropylene material of the helmet base 108 to be manipulated as desired consistent with the direction of the fold lines 114 and the stress release holes 116.

It is emphasized that it is the combination of the stress release holes 116 and the fold lines 114 engineered into the pattern of the helmet base 108 shown in FIG. 5 that enables the helmet 106 to be manipulated into the desired shape. It is understood that the structure must also include the integrally-molded, single-component snap fasteners 102 and a plurality of slots 138 with one slot 138 located between each of the plurality of segments 118. It is the combination of the pattern of the plurality of segments 118 and the slots 138 located between each of those segments 118 that enable the polypropylene material of the helmet base 108 to be manipulated in a desired manner. By forming the polypropylene material into a pattern as shown in FIG. 5, the polypropylene material and the memory associated therewith is altered which changes the material equilibrium characteristics. It is important to note that the shape of the pattern is imperative to the mechanics of the resulting structure. The spring properties and the memory of the polypropylene material is what is employed to create the exoskeleton structure 104 of the helmet 106 where the exoskeleton structure is defined to be the external protective and supportive structure. The slots 138 between the plurality of segments 118 of the helmet base 108 permit the polypropylene material to be bent and secured in more than one direction. However, once the snap fasteners 102 are disengaged, the spring-like properties of the polypropylene material will adopt the flat profile exhibited prior to the formation of the exoskeleton structure 104 notwithstanding the existence of the slots 138 and segments 118.

The baseline area 120 supports each of the plurality of segments 118 including the first helmet segment 122, second helmet segment 124, third helmet segment 126, fourth helmet segment 128, and the fifth helmet segment 130. Additionally, the baseline area 120 also serves as a support attachment area for other components of the helmet 106 as shown in FIGS. 1-3 including an inner visor 140, a pair of cheek guards 142, 144, and a rear neck guard 146. A pair of ear recesses 148 and 150 are formed within the baseline area 120 for accommodating the ears of a person (not shown) wearing the helmet 106. Additionally a pair of cheek guard trim components 152 and 154 are also shown superimposed over the cheek guards 142 and 144 for providing a bow structure resulting in additional reinforcement and stiffening. Further, an outer visor trim component 156 is shown superimposed over the inner visor 140 which also provides a bow structure resulting in additional reinforcement and stiffening. A pair of cheek guard flanges 158 and 160 are integrally connected to the helmet base 108 as shown in FIG. 5 for providing an attachment point for the cheek guards 142 and 144 and the corresponding cheek guard trim components 152 and 154. Also note that several of these components parts are shown separated from the helmet base 108 in related drawings. For example, the inner visor 140 is shown separate in FIG. 8, the outer visor trim component 156 is shown separate in FIG. 9, the rear neck guard 146 is shown separate in FIG. 10, the pair of cheek guards 142, 144 are shown separate in FIG. 11, and the pair of cheek guard trim components 152, 154 are shown separate in FIG. 12.

A pair of lateral flaps 162, 164 are shown in the plan view of the helmet base 108 in FIG. 5. The lateral flaps 162, 164 serve to secure the helmet base 108 in a circular form to fit onto the head of a person (not shown) wearing the helmet 106. A pair of directional arrows 166 and 168 are included in FIG. 5 to illustrate how the planer layout of the helmet base 108 is manipulated to provide the circular structure suitable for wearing that is shown in FIGS. 1-3. The plurality of segments 118 of the helmet base 108 each includes a segment tongue comprising a first segment tongue 170, a second segment tongue 172, a third segment tongue 174, a fourth segment tongue 176, and a fifth segment tongue 178. Each of the segment tongues 170, 172, 174, 176 and 178 includes one of said plurality of apertures 112 formed therein with one of said snap fasteners 102 mounted within the corresponding aperture 112 for attachment to one of the fastener connection tabs 110. In particular, the segment tongues 170, 172, 174, 176 and 178 connect to a six fastener connection tab 180 that is clearly shown in FIGS. 19 and 20. The six fastener connection tab 180 can also be partially seen in the cross-sectional view of FIG. 4. A more detailed discussion of fastener connection tabs 110 and, in particular, the six fastener connection tab 180 is set out herein below. Each of the segments 118 is comprised of a thin layer of polypropylene material anchored to the base line area 120 and to the six fastener connection tab 180 best shown in FIGS. 2 and 3. As described herein above, each thin layer segment 118 is attempting to spring away from the attachment point, i.e., the six fastener connection tab 180. As a result of attaching each of the segment tongues 170, 172, 174, 176 and 178 to the six fastener connection tab 180, the combined segments 118 form a dome that comprises a flexible self-supporting structure that is clearly shown in FIG. 3.

Figure 8:
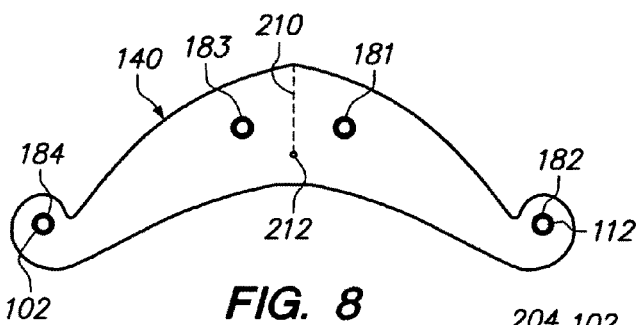
FIG. 8 is a flat planar view of an inner visor of the toy helmet of FIG. 1 showing a fold line and a plurality of apertures formed there through for illustrating the method for constructing a product and the fasteners utilized therewith.
Figure 11:
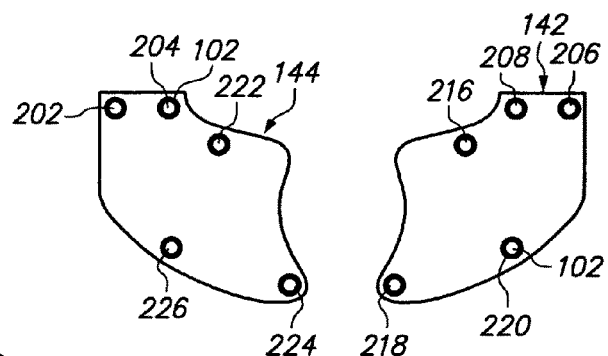
FIG. 11 is a flat planar view of the inner cheek guards of the toy helmet of FIG. 1 showing a plurality of apertures formed there through for illustrating the method for constructing a product and the fasteners utilized therewith.
Figure 9:
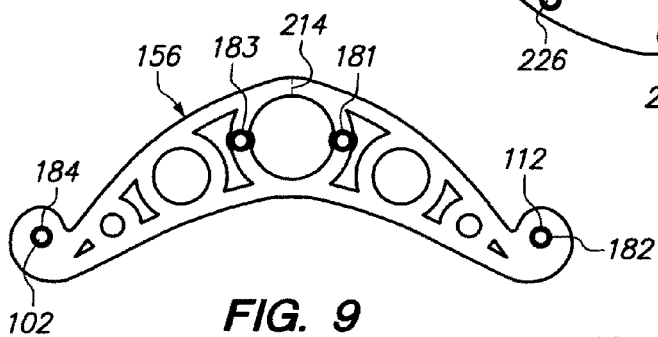
FIG. 9 is a flat planar view of a visor trim of the toy helmet of FIG. 1 showing a plurality of apertures formed there through for illustrating the method for constructing a product and the fasteners utilized therewith.
Figure 12:
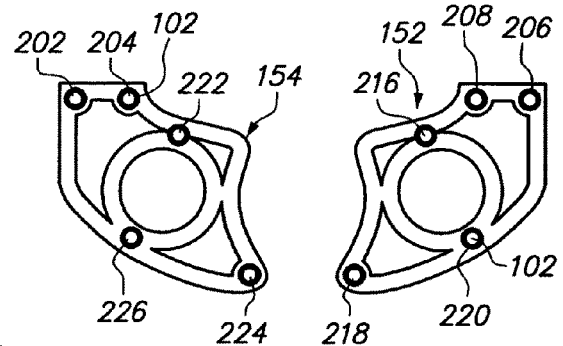
FIG. 12 is a flat planar view of a pair of cheek guard trim components of the toy helmet of FIG. 1 showing a plurality of apertures formed there through for illustrating the method for constructing a product and the fasteners utilized therewith.
Figure 10:
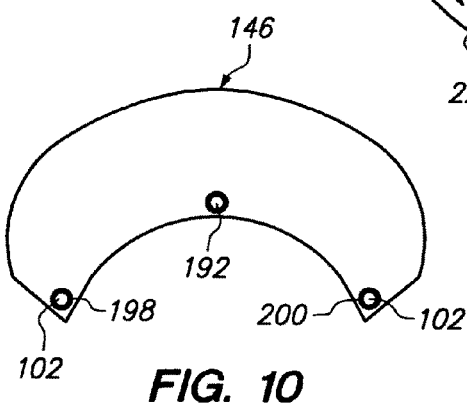
FIG. 10 is a flat planar view of the rear neck guard of the toy helmet of FIG. 1 showing a plurality of apertures formed there through for illustrating the method for constructing a product and the fasteners utilized therewith.

The inner visor 140 in combination with the outer visor trim component 156 is employed (a) to strengthen the frontal section of the helmet base 108, and (b) to function as a decorative item which adds to the esthetic attraction of the helmet 106. Both the inner visor 140 and the outer visor trim component 156 are attached to the frontal section of the helmet base 108 at two locations. There are a pair of fastener positions 182 and 184 at the forward part of the helmet base 108 that are employed to connect the inner visor 140 and the outer visor trim component 156 to the helmet base 108 as shown in FIGS. 1, 2, 5, 8 and 9. The fastener positions 182 and 184 shown in FIGS. 1 and 2 correspond to the fastener positions 182 and 184 shown in FIGS. 8 and 9, respectively. These fastener positions 182 and 184 align with corresponding apertures 112 for attaching to the helmet base 108. Two additional fastener positions 181 and 183 exist in both the inner visor 140 and the outer visor trim component 156 as shown in FIGS. 1, 8 and 9. The fastener positions 181 and 183 align with corresponding apertures 112 shown in FIGS. 8 and 9 for connecting together the inner visor 140 and the outer visor trim component 156 to form a strengthening bow structure. Each of the apertures 112 formed in the helmet base 108 includes a snap fastener 102 mounted therein. When it is desired to call attention to a particular snap fastener mounted within a particular aperture location on the helmet base 108, that particular snap fastener is referred to as a fastener position. The inner visor 140 exhibits a fold line 210 as shown in FIGS. 1, 2 and 8 that ends in a stress release hole 212 to provide the release of stress associated with the fold line 210. The fold line 210 creates a stiffening in the direction of the fold to provide a creased look in the inner visor 140. Another fold line 214 is formed within the outer visor trim component 156 as shown in FIGS. 1 and 9 that corresponds to fold line 210 of FIGS. 1 and 8.

The rear neck guard 146 comprises a flat polypropylene material layer that is not under mechanical load and thus is not subjected to stress. The function of the rear neck guard 146 is to maintain the curved shape of the baseline area 120 of the helmet base 108 as shown in FIG. 2. The rear neck guard 146 connects to the baseline area 120 at several locations. Fastener positions 186, 188 shown in the baseline area 120 in FIG. 5 serve to close the helmet base 108 upon itself but also to provide an attachment position for the rear neck guard 146 as shown in FIG. 2. A three-fastener connection tab 190 as shown in FIGS. 21 and 22 connects to a fastener position 192 in the rear neck guard 146 shown in FIG. 10 and to the fastener positions 186, 188 of the base line area 120 as shown in FIGS. 2 and 3. Also, the baseline area 120 includes two separate fastener positions 194 and 196 shown in FIG. 5 to complete the connection of the rear neck guard 146. A pair of two fastener connection tabs 198 and 200 shown in FIGS. 23 and 24 connect to fastener positions 194 and 196, respectively, best shown in FIGS. 2 and 3 to secure the rear neck guard 146 to the baseline area 120 of the helmet base 108.

The cheek guard flanges 158 and 160 shown in FIG. 5 are utilized to attach the inner cheek guards 142, 144 and the outer cheek guard trim components 152, 154 to the helmet base 108 as shown in FIGS. 1-3. The inner cheek guards 142 and 144 function to guard the face of a person (not shown) wearing the helmet 106. The cheek guards 142, 144 are fashioned from a flat piece of polypropylene and are not under any spring tension. The inner cheek guards 142, 144 and the outer cheek guard trim components 152, 154 are somewhat mis-sized with the outer cheek guard trim components 152, 154 being somewhat larger. The diagonal dimension of both of the outer cheek guard trim components 152, 154 is somewhat longer than the diagonal dimension of the inner cheek guards 142, 144. However, the apertures 112 of the outer cheek guard trim components 152, 154 are substantially aligned with the corresponding apertures 112 of the inner cheek guards 142, 144 so that the snap fasteners 102 will align for attachment purposes.

A pair of fastener positions 202 and 204 shown in FIGS. 1, 2, 11, and 12 serve to align and connect both the inner cheek guard 144 and outer cheek guard trim component 154 to the cheek guard flange 160 as shown in FIGS. 1 and 2. Likewise, a pair of fastener positions 206 and 208 shown in FIGS. 1, 3, 11, and 12 serve to align and connect both the inner cheek guard 142 and outer cheek guard trim component 152 to the cheek guard flange 158 as shown in FIGS. 1 and 3. The purpose of the double layer comprising the inner cheek guards 142, 144 and the outer cheek guard trim components 152, 154 is (a) to provide stiffening to the construction, and (b) to prevent the somewhat larger outer cheek guard trim components 152, 154 from bowing or flexing with respect to the somewhat shorter inner cheek guards 142, 144. Three additional fastener positions 216, 218 and 220 are employed to affix the inner cheek guard 142 to the outer cheek guard trim component 152 as is clearly shown in FIGS. 1, 3, 11 and 12. Likewise, three more fastener positions 222, 224, 226 are employed to affix the inner cheek guard 144 to the outer cheek guard trim component 154 as is clearly shown in FIGS. 1, 2, 11 and 12.

The ear recesses 148 and 150 shown in FIGS. 2 and 3 but best shown in FIG. 5 are intended to provide an accommodation for the ears of the person (not shown) wearing the helmet 106. Each of the ear recesses 148 and 150 include a pair of fold lines. In particular, ear recess 148 includes a pair of fold lines 228 and 230 as shown in FIG. 5, while ear recess 150 includes a pair of fold lines 232 and 234 also shown in FIG. 5. The fold lines 228, 230 associated with ear recess 148, and the fold lines 232, 234 associated with ear recess 150 function to stiffen the polypropylene material in the direction of the fold. Thus, the polypropylene material is stiffened around the respective ear recesses 148 and 150. This design creates a facet between the ear recess fold lines 228, 230 and 232, 234, respectively, to allow the ear recesses 148 and 150 to fit closely to the ear of the person (not shown) wearing the helmet 106.

Figure 6:
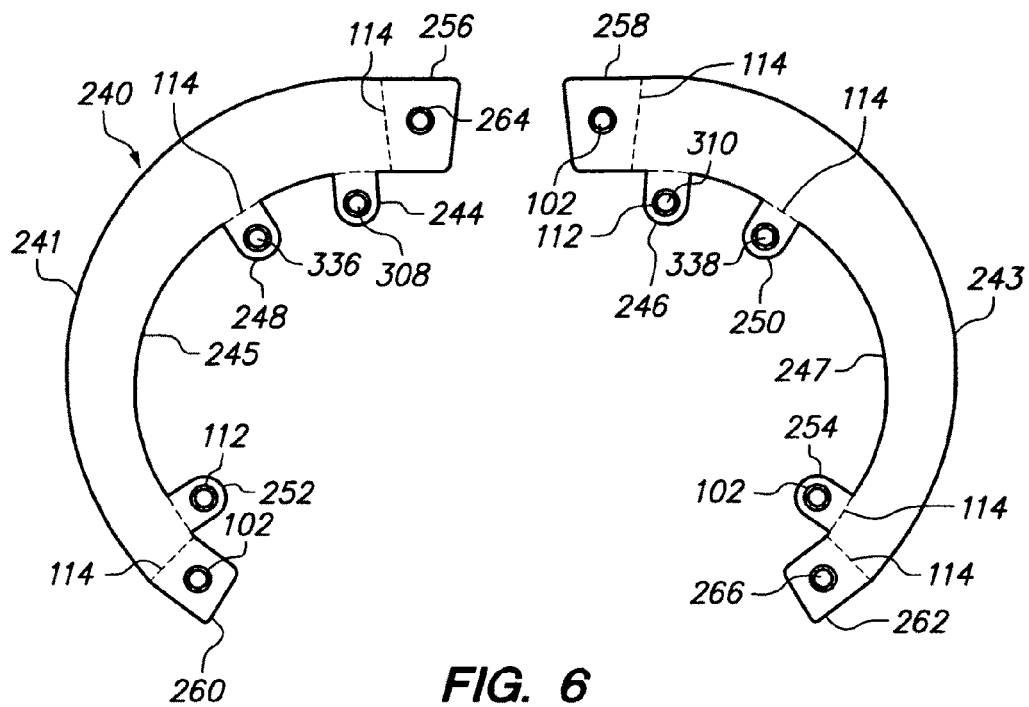
FIG. 6 is an unassembled flat planar view of the comb of the toy helmet of FIG. 1 showing a plurality of connection tabs and fold lines for illustrating the method for constructing a product and the fasteners utilized therewith.
Figure 7:
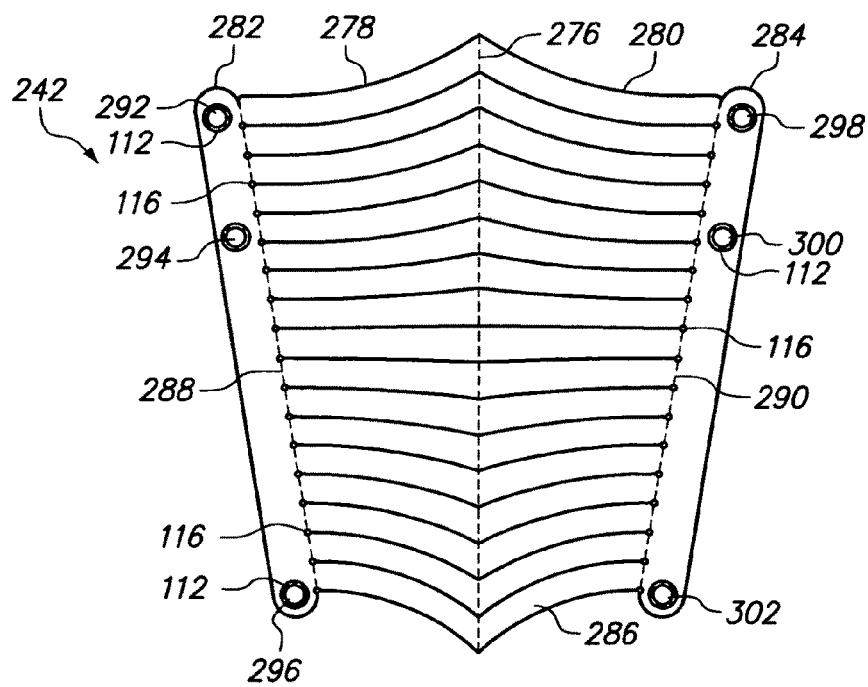
FIG. 7 is an unassembled flat planar view of the plume of the toy helmet of FIG. 1 showing ribbons of polypropylene material extending between adjacent connection strips for illustrating the method for constructing a product and the fasteners utilized therewith.

The top surface 238 of the helmet base 108 of the helmet 106 includes a rectangular-shaped comb 240 and a decorative plume 242 as shown in FIGS. 1-4. Further, the two component parts comprising (a) the comb 240 is shown in FIG. 6, while (b) the construction of the plume 242 is shown in FIG. 7. The combination of the comb 240 and the plume 242 which is supported by the structure of the comb 240 is shown in a side elevation in FIG. 3 and in a detailed cross-sectional view illustrating the specific connections in FIG. 4. It is noted that all of the connections are facilitated by use of a plurality of the integrally molded, single-component snap fasteners 102 which will be described in detail herein below. The description of the combination of the comb 240 and the plume 242 will commence with a discussion of the comb 240 shown in FIG. 6. The cross-section view of the helmet base 108 shown in FIG. 4 will be discussed there after.

Figure 4:
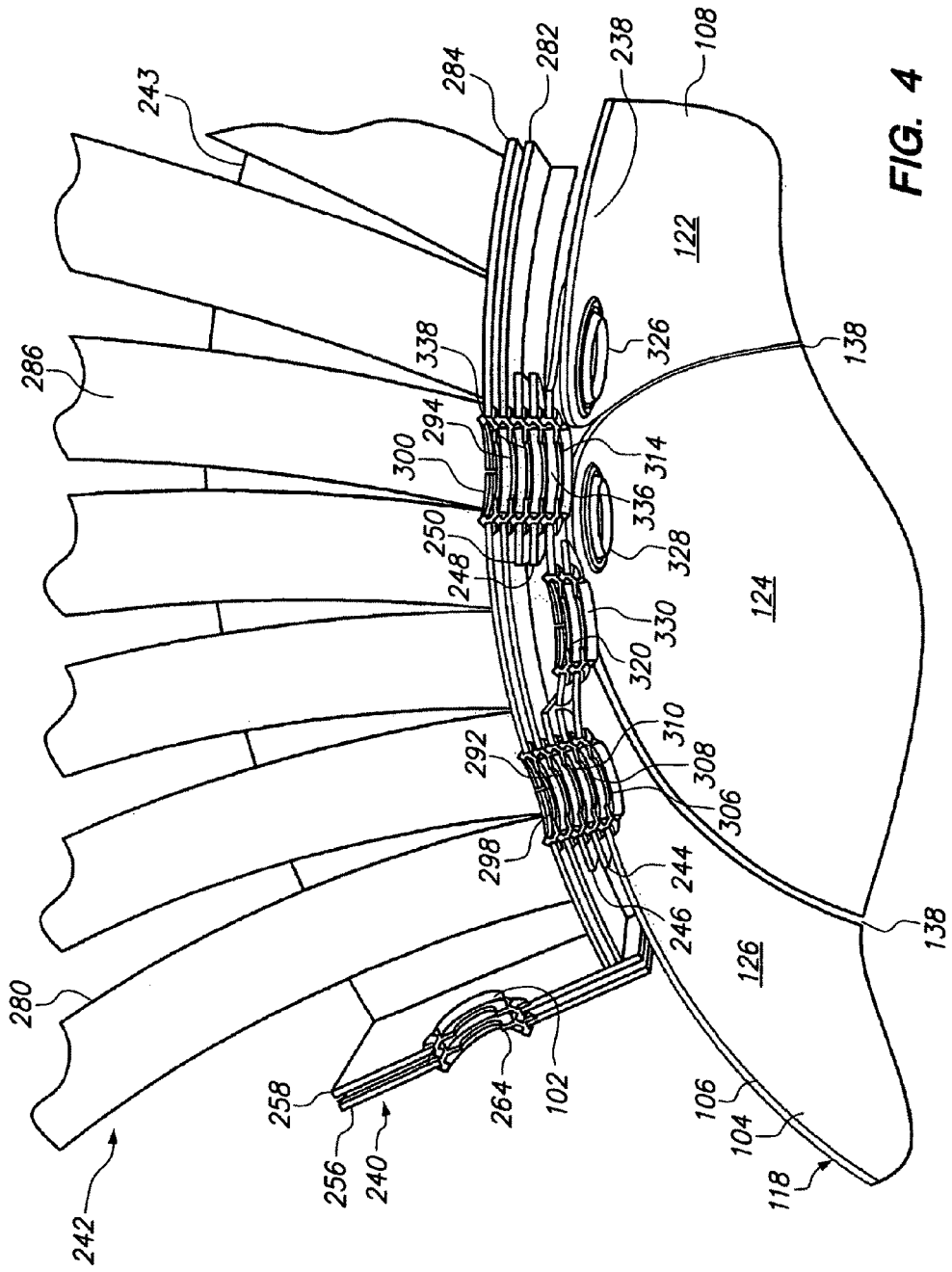
FIG. 4 is a fragmented cross-sectional view of the toy helmet of FIG. 1 taken along the line 4-4 of FIG. 3 showing the attachment interface between the comb, plume and the top surface of the helmet base for further illustrating the method for constructing a product and the fasteners utilized therewith.

The comb 240 as shown in FIG. 6 comprises a first part 241 and a second part 243 which when assembled together forms a rectangular channel best shown in FIGS. 1 and 2. Each of the first part 241 and the second part 243 of the comb 240 is shown as a semi-circular structure which is designed to fit along the top curved surface of the helmet base 108. The semi-circular structure of the first part 241 and the second part 243 have opposing inner curved surfaces 245 and 247 as shown in FIG. 6. Extending from the opposing inner curved surfaces 245 and 247 is a plurality of six connection tabs including a tab 244, a tab 246, a tab 248, a tab 250, a tab 252, and a tab 254. The six connection tabs form pairs that when connected form the curved rectangular channel that is the comb 240 as shown in FIG. 2. Each of the connection tabs 244, 246, 248, 250, 252, and 254 includes a fold line 114 to enable each of the respective connection tabs to be folded during the assembly of the comb 240. The folding of each of the connection tabs enables the corresponding pairs to be matched and attached together by snap fasteners 102 as shown in FIG. 4. Those corresponding pairs include (1) connection tabs 244 and 246, (2) connection tabs 248 and 250, and (3) connection tabs 252 and 254 as shown in FIG. 6. Additionally, the comb 240 includes a pair of front connection tabs 256 and 258 and a pair of rear connection tabs 260 and 262.

The front connection tab 256 and the rear connection tab 260 each extend from the inner curved surface 245. Likewise, the front connection tab 258 and the rear connection tab 262 each extend from the inner curved surface 247 as shown in FIG. 6. Additionally, the front connection tabs 256, 258 and the rear connection tabs 260, 262 each include a fold line 114 to enable each of those respective connection tabs to be folded during the assembly of the comb 240. The fold lines 114 associated with (1) the pairs of the connection tabs 244, 246, and 248, 250, and 252, 254, and (2) the front connection tabs 256, 258, and (3) the rear connection tabs 260, 262, enable the formation of the rectangular, box-like structure of the comb 240 since the fold lines 114 stiffen the polypropylene material in the direction of the fold. Also, the pairs of connection tabs 244, 246, and 248, 250, and 252, 254, in addition to the front connection tabs 256, 258, and the rear connection tabs 260, 262 each include one of the plurality of apertures 112 formed therein. Thus, the fold lines 114 shown in FIG. 6 also enable the apertures in the plurality of connection tabs 244, 248, 252 and 256 to align with the apertures formed in the corresponding connection tabs 246, 250, 254 and 258 and with the corresponding snap fasteners mounted in the top of the helmet base 108 as shown in FIG. 4.

Mounted in each of the apertures 112 of the pairs of connection tabs 244, 246, and 248, 250, and 252, 254, and the front connection tabs 256, 258 and the rear connection tabs 260, 262 is a snap fastener 102 as will be described herein below. In the comb 240, a fastener position 264 mounted in the front connection tab 256 is shown in FIGS. 1, 3 and 4, and a fastener position 266 mounted in the rear connection tab 262 is shown in FIG. 3. By attaching the front connection tabs 256 and 258 at the fastener position 264, the forward end of the rectangular shaped comb 240 is closed. Likewise, by attaching the rear connection tabs 260, 262 at the faster position 266, the rearward end of the rectangular shaped comb 240 is also closed. The structure of the comb 240 is comprised of flat polypropylene material that is not under a stress load. Upon completion of this assembly, the comb 240 forms the rectangular, box-shaped channel shown best in FIG. 1 but is also partially shown in the cross-sectional view of FIG. 4. As will be described herein below, the rectangular shaped channel of the comb 240 serves to receive and help secure the assembly of the decorative plume 242 which is described in FIG. 7.

The plume 242 is positioned within the comb 240 and is mounted on a top surface 238 of the helmet base 108 as is clearly shown in FIGS. 1-3. The plume 242 functions as a decorative component of the helmet 106. The structure of the decorative plume 242 is shown in FIG. 7 and comprises a sheet of polypropylene material that includes a main fold 276 positioned down the center of the polypropylene material. The main fold 276 separates the polypropylene material into halves including a first half 278 and a second half 280. Each half 278, 280 of the polypropylene material terminates in a connection strip. Thus, the first half 278 of the polypropylene plume 242 terminates in a connection strip 282 and the second half 280 of the polypropylene plume 242 terminates in a connection strip 284 as shown in FIG. 7. The polypropylene material of the plume 242 is cut into a plurality of strips 286 that resemble ribbons for providing the decorative feature of the plume 242. The pair of connection strips 282 and 284 each serve as an anchor point for one of the two ends of each of the plurality of strips 286. At the intersection of each of the plurality of strips 286 with the connection strip 282 is a first fold line 288. Likewise, at the intersection of each of the plurality of strips 286 with the connection strip 284 is a second fold line 290. Additionally, the end of each of the plurality of strips 286 where each strip 286 anchors into the connection strip 282 and the connection strip 284 is a stress release hole 116. The stress release holes 116 serve to release the stress that accumulates at the first fold line 288 and the second fold line 290.

Both the connection strip 282 and the connection strip 284 of the decorative plume 242 shown in FIG. 7 include a plurality of three apertures 112 formed therein. Each of the apertures 112 formed within the connection strip 282 includes a snap fastener 102 mounted therein so that connection strip 282 includes a plurality of snap fastener positions 292, 294 and 296, respectively. Likewise, each of the apertures 112 formed within the connection strip 284 includes a snap fastener 102 mounted therein so that the connection strip 284 includes a plurality of snap fastener positions 298; 300 and 302, respectively. When the decorative plume 242 is mounted within the comb 240 as is shown in FIGS. 1-3, the apertures 112 and the plurality of snap fastener positions are aligned so that they will cooperate with the top surface 238 of the helmet base 108 as is shown in FIG. 4. The alignment between the plume 242 and the comb 240 is in the following manner. The fastener positions 244, 248 and 252 of the first part 241 of the comb 240 shown in FIG. 6 is aligned with the fastener positions 292, 294 and 296 of the connection strip 282 of the plume 242 shown in FIG. 7. Likewise, the fastener positions 246, 250 and 254 of the second part 243 of the comb 240 shown in FIG. 6 is aligned with the fastener positions 298, 300 and 302 of the connection strip 284 of the plume 242 shown in FIG. 7.

The connection strips 282 and 284 are then folded at the first fold line 288 and the second fold line 290, respectively, and then tucked underneath the first half 278 and the second half 280, respectively, of the polypropylene material as shown in FIG. 7. This maneuver accomplishes the alignment of the fastener positions between the plume 242 and the comb 240. Once the apertures 112 and the corresponding fastener positions are aligned, stress is applied to the plurality of strips 286 of the polypropylene material in the plume 242. This stress on polypropylene material causes the individual strips 286 of the plume 242 to "fan out" to form the decorative display as shown in FIGS. 1-3. The individual strips 286 of the plume 242 separate and "fan out" because the plume 242 and the comb 240 are stretched out and curved along the rounded top surface 238 of the helmet base 108.

The pair of connection tabs 252 and 254 of the comb 240 shown in FIG. 6 serve to anchor the rear end of the comb 240 to the helmet base 108. After the comb 240 has been assembled into the rectangular shaped channel as shown in FIG. 1, the pair of connection tabs 244, 246, and 248, 250, and 252, 254 are folded so that their apertures 112 and the snap fasteners 102 mounted within those apertures 112 are aligned. Likewise, after the plume 242 shown in FIG. 7 has been positioned within the comb 240, the pair of connection strips 282, 284 are manipulated along the first and second fold lines 288, 290 so that the apertures 112 and the corresponding snap fasteners positions 292, 298, and 294, 300, and 296, 302 mounted therein are properly aligned with the snap fastener positions in the comb 240 and the top surface 238 of the helmet base 108 as is shown in FIG. 4. Specifically, the snap fastener positions 292, 298, and 294, 300, and 296, 302 of the plume 242 shown in FIG. 7 are properly aligned with the snap fasteners 102 mounted in the apertures 112 of the connection tabs 244, 246, and 248, 250, and 252, 254 of the comb 240 clearly shown in FIG. 6.

Reference to FIG. 5 shows a pair of apertures 112 having snap fastener positions 270 and 272 mounted therein each of which are located on the opposing lateral flaps 162 and 164. When the baseline area 120 of the helmet base 108 is closed upon itself to form a ring shaped structure (suitable for placing on a persons head), the two snap fastener positions 270 and 272 are immediately adjacent to one another as shown in FIGS. 2 and 3. Thus, three snap fastener positions are located adjacent to one another including (1) snap fasteners 102 mounted within the apertures 112 formed in overlapping connection tabs 252, 254 of the comb 240 shown in FIG. 6, which are stacked and aligned with the overlapping pair of snap fastener positions 296, 302 of the plume 242, and (2) snap fastener position 270 located in lateral flap 162 shown in FIG. 5, and (3) snap fastener position 272 located in the lateral flap 164 also shown in FIG. 5. A three fastener connection tab 274 shown in FIGS. 2 and 3 is utilized to connect these three fastener positions together including (1) the snap fasteners 102 mounted within the connection tabs 252, 254 of the comb 240, and the snap fastener positions 296, 302 of the plume 242 shown in FIGS. 6 and 7, respectively, (2) snap fastener position 270 shown in FIG. 5, and (3) snap fastener position 272 also shown in FIG. 5. The three fastener connection tab 274 is shown in part on FIG. 2 and in part on FIG. 3. The general construction of a three fastener connection tab is shown in FIGS. 21 and 22.

Figure 18:
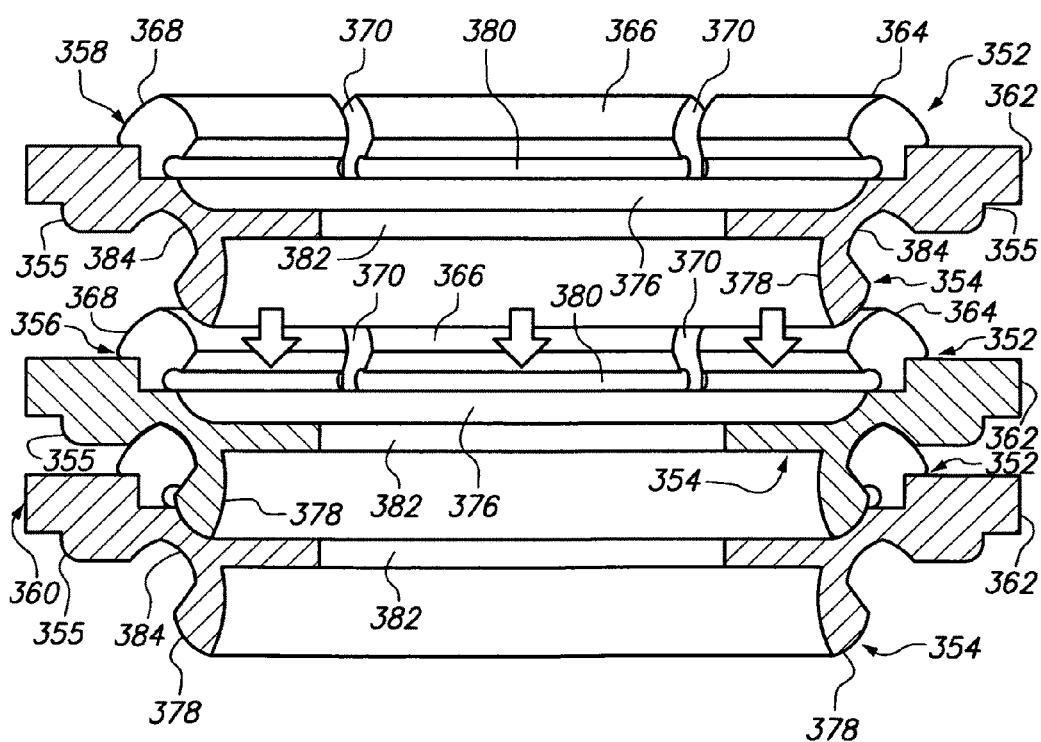
FIG. 18 is a fragmented cross-sectional view of three snap fasteners of the toy helmet of FIG. 1 taken along line 18-18 of FIG. 14 showing the snap fasteners in stacked mechanical communication in which the male section of each snap fastener is receivable and lockable within the female section of any adjacent snap fastener, the snap fasteners utilized in the inventive method for constructing a product.

Reference will now be made to FIG. 4 which is a cross-sectional view of the cooperating connections between the plume 242, comb 240 and the top surface 238 of the helmet base 108. In the last paragraph, the attachment of the plume 242 at the fastener positions 296 and 302 shown in FIG. 7 and the connection tabs 252 and 254 of the comb 240 shown in FIG. 6, to the three fastener connection tab 274 and the fastener positions 270 and 272 each shown in FIG. 5 has been shown in FIGS. 2 and 3. FIG. 4 illustrates other connections between the plume 242 and comb 240 with the top surface 238 of the helmet base 108. The front connection tab 256 and the front connection tab 258 of the comb 240 shown in FIG. 6 are also shown overlapping in FIG. 4. In particular, the front connection tab 256 overlaps front connection tab 258. A snap fastener 102 is shown mounted within the front connection tab 258 while the fastener position 264 is shown mounted within the front connection tab 256 in both FIGS. 4 and 6. The snap fastener 102 mounted in connection tab 258 is mechanically attached to the snap fastener at fastener position 264 as shown in FIG. 18. It is emphasized that each of the apertures 112 formed in the helmet base 108 includes a snap fastener 102 mounted therein. When it is desired to call attention to a particular snap fastener mounted within a particular aperture location on the helmet base 108, that particular snap fastener is referred to as a fastener position. Thus, fastener position 264 of the comb 240 shown in FIGS. 4 and 6 is also prominently displayed on FIG. 1 mounted on the comb 240.

Located immediately behind the front connection tabs 256, 258 in FIG. 4, is a stacking of five snap fasteners utilized to connect the plume 242 and the comb 240 to the helmet base 108. Located on the third helmet segment 126 shown in FIG. 5 is an aperture 118 having a snap fastener position 306 mounted therein. Referring to the comb 240 in FIG. 6, the pair of connection tabs 244 and 246 are each folded at fold lines 114 to align a pair of corresponding fastener positions 308 and 310, respectively, with the fastener position 306 in the helmet base 108 as shown in FIG. 4. Note that the fastener position 308 is mounted within the aperture 112 of the connection tab 244, and the fastener position 310 is mounted within the aperture 112 of the connection tab 246. Now referring to the plume 242 in FIG. 7, the pair of snap fastener positions 292 and 298 are each folded at the first fold line 288 and the second fold line 290, respectively, to align with the fastener positions 308, 310 of the comb 240 and the fastener position 306 mounted in the third helmet segment 126 shown in FIG. 4. Each of the five snap fastener positions 306, 308, 310, 292 and 298 are mechanically stacked and attached to one another as shown in FIG. 4.

Located on the top surface 238 of the helmet base 108 is another stacking of five snap fasteners also utilized (1) to connect the plume 242 and the comb 240 to the helmet base 108, and (2) to connect together the plurality of five helmet segments 122, 124, 126, 128 and 130 shown in FIGS. 1-5. To accomplish this task, the six fastener connection tab 180 shown in FIGS. 19 and 20 is utilized and is partially shown positioned within the top surface 238 of the helmet base 108 in FIGS. 1-4. The multi-fastener connection tabs as a group of connectors has been identified by the general number 110. However, when referring to a particular multi-fastener connection tab, such as the six fastener connection tab 180, a specific identification number will be utilized. Referring generally to FIGS. 19 and 20, the six fastener connection tab 180 is shown having a snap fastener position 314 mounted in a center aperture 112 and five additional snap fastener positions 316, 318, 320, 322 and 324 mounted in corresponding apertures 112 surrounding the center aperture 112. FIG. 19 illustrates the six fastener connection tab 180 from a top view while FIG. 20 illustrates the six fastener connection tab 180 from a bottom view.

Now referring to FIG. 5, each of the apertures 112 located within the first segment tongue 170, second segment tongue 172, third segment tongue 174, fourth segment tongue 176, and fifth segment tongue 178 includes a snap fastener 102 mounted therein. In particular, a fastener position 326 is mounted within the first tongue segment 170, a fastener position 328 is mounted within the second tongue segment 172, a fastener position 330 is mounted within the third tongue segment 174, a fastener position 332 is mounted within the fourth tongue segment 176, and a fastener position 334 is mounted within the fifth tongue segment 178 as shown in FIG. 5. It is noted that each of the snap fastener positions 316, 318, 320, 322 and 324 of the six fastener connection tap 180 connects to one of the snap fastener positions mounted in an aperture 112 within a corresponding one of the segment tongues 170, 172, 174, 176 and 178 as shown in FIG. 4. Specifically, snap fastener position 316 of connection tab 180 connects to snap fastener position 326 of segment tongue 170, snap fastener position 318 of connection tab 180 connects to snap fastener position 328 of segment tongue 172, snap fastener position 320 of connection tab 180 connects to snap fastener position 330 of segment tongue 174, snap fastener position 322 of connection tab 180 connects to snap fastener position 332 of segment tongue 176, and snap fastener position 324 of connection tab 180 connects to snap fastener position 334 of segment tongue 178 as shown in FIG. 4.

The snap fastener position 314 located at the center of the six fastener connection tab 180 is supported by the other five snap fastener positions 316, 318, 320, 322, and 324. Further, the center snap fastener position 314 functions as the attachment point to support the comb 240 and the plume 242. Referring to the comb 240 in FIG. 6, the pair of connection tabs 248 and 250 are each folded at fold lines 114 to align a pair of corresponding fastener positions 336 and 338, respectively, with the snap fastener position 314 at the center of the six fastener connection tab 180 shown in FIG. 4. Note that the fastener position 336 is mounted within the aperture 112 of the connection tab 248, and the fastener position 338 is mounted within the aperture 112 of the connection tab 250. Now referring to the plume 242 in FIG. 7, the pair of snap fastener positions 294 and 300 are each folded along the fold line 288 and the fold line 290, respectively, to align with the fastener positions 336, 338 of the comb 240 and the fastener position 314 at the center of the six fastener connection tab 180 as shown in FIG. 4. Each of the five snap fastener positions 314, 336, 338, 294 and 300 are mechanically stacked and attached to one another as shown in FIG. 4.

The helmet base 108 includes a chin strap 340 as is clearly shown in FIGS. 1-3 and FIGS. 25-26 for securely holding the helmet 106 on the head of a person (not shown). The chin strap 340 is removable and can be fashioned from any of a plurality of materials including polypropylene or nylon or any suitable material. The design of the chin strap 340 utilizes a plurality of the snap fasteners 102 to provide an adjustable strap that can easily be connected and disconnected to ensure that the helmet 106 remains secure on the head of a person (not shown). This design employs the use of a linear version of a six fastener connection tab to complete the chin strap 340 connection. An inspection of FIGS. 1-3 discloses that two identical first and second linear six fastener connection tabs 342 and 344, respectively, are combined to form the chin strap 340.

The first linear six fastener connection tab 342 and the second linear six fastener connection tab 344 are shown best in FIGS. 25 and 26. The linear six fastener connection tab shown in FIG. 25 is a top perspective view identified as the first linear six fastener connection tab 342. Likewise, the linear six fastener connection tab shown in FIG. 26 is a bottom perspective view identified as the second linear six fastener connection tab 344. Notwithstanding, the two connection tabs 342 and 344 are identical and both FIGS. 25 and 26 apply to either of the first linear six fastener connection tab 342 or the second linear six fastener connection tab 344. Each of the linear connection tabs 342 and 344 includes a single snap fastener 102 at a distal end 346 and a plurality of five snap fasteners 102 at a proximal end 348 as shown in FIGS. 25 and 26. Each of the snap fasteners 102 is mounted in an aperture 112 formed in the first linear six fastener connection tab 342 and the second linear six fastener connection tab 344.

Each of the identical first and second linear six fastener connection tabs 342 and 344 connects to an existing inside fastener of the helmet base 108. Thus, each side of the helmet base 108 has one of the pair of the linear six fastener connection tabs 342, 344 of the chin strap 340 connected to the corresponding side of the helmet 106. Specifically, the snap fastener 102 mounted within the aperture 112 at fastener position 202 on the distal end 346 of the first linear six fastener connection tab 342 shown in FIG. 25 is connected at the rear end of the inner cheek guard 144 shown in FIG. 1 and also in FIG. 5. Likewise, the snap fastener 102 mounted within the aperture 112 at fastener position 206 on the distal end 346 of the second linear six fastener connection tab 344 shown in FIG. 26 is connected at the rear end of the inner cheek guard 142 shown in FIG. 3 and also in FIG. 5. In each case, the snap fastener position 202 and the snap fastener position 206, respectively, is the fourth fastener layer behind (1) the outer cheek guard trim component 154 and 152, respectively, (2) the inner cheek guards 144, 142, and (3) cheek guard flanges 160 and 158 of the helmet base 108. Finally, the five snap fasteners 102 located at the proximal end 348 in the first linear six fastener connection tab 342 shown in FIG. 25, and the five snap fasteners 102 located at the proximal end 348 in the second linear six fastener connection tab 344 shown in FIG. 26 can be engaged and disengaged to ensure that the chin strap 340 is snug for securing the helmet 106 in position.

Let us now turn our attention to a discussion of the integrally molded, single-component snap fastener 102 which is shown in FIGS. 13-18. It is noted that the snap fastener has been referred to in this patent application by the general reference number 102. However, during the discussion of the structure of the present invention, when reference is made to a specific snap fastener, a separate identification number has been used and referred to as a snap fastener position. It is understood that a snap fastener position identifies a specific snap fastener 102 mounted within an aperture 112. It is also understood that each snap fastener 102 is identical to all other snap fasteners 102 utilized in the present invention. However, some snap fasteners 102 are employed in a different form such as in (1) the six fastener connection tab 180 shown in FIG. 4, (2) the three fastener connection tab 190 shown in FIG. 2, (3) the two fastener connection tabs 198 and 200 shown in FIGS. 2 and 3, respectively or (4) the first and second linear six fastener connection tabs 342 and 344 shown in FIGS. 25 and 26, respectively. Each of these connection tab constructions includes two or more snap fasteners 102 and will have a separate identification number.

Snap fasteners manufactured in the past typically included four components including (1) a male component, (2) a cover to cap the rear side of the male component that extends through the mounting material such as a fabric, (3) a female component, and (4) a cover to cap the rear side of the female component that extends through the mounting material. Furthermore, the male component of past snap fastener constructions typically was independent of the female component. In the present invention, the inventive snap fastener 102 is a single component snap fastener of unitary construction comprising only one component, that is, the snap fastener 102 is integrally molded. The single component snap fastener 102 comprises a female section 352 and a male section 354 each supported and separated by a body section 355 as shown in FIGS. 13-16 but best shown in FIG. 17. The construction of the female section 352 of the snap fastener 102 will be described first.

Figure 13:
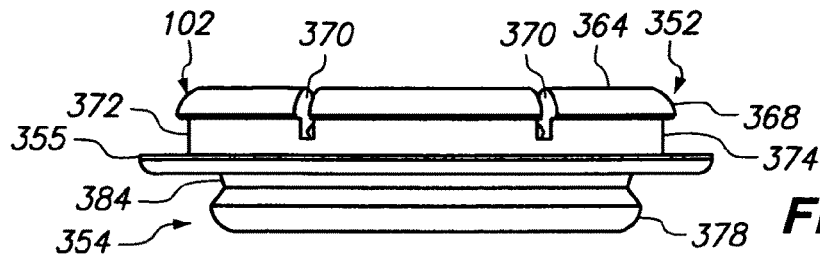
FIG. 13 is a side elevation view of a snap fastener of the toy helmet of FIG. 1 showing a female section formed on the upper side and a male section formed on the lower side, the snap fastener utilized in the inventive method for constructing a product.
Figure 17:
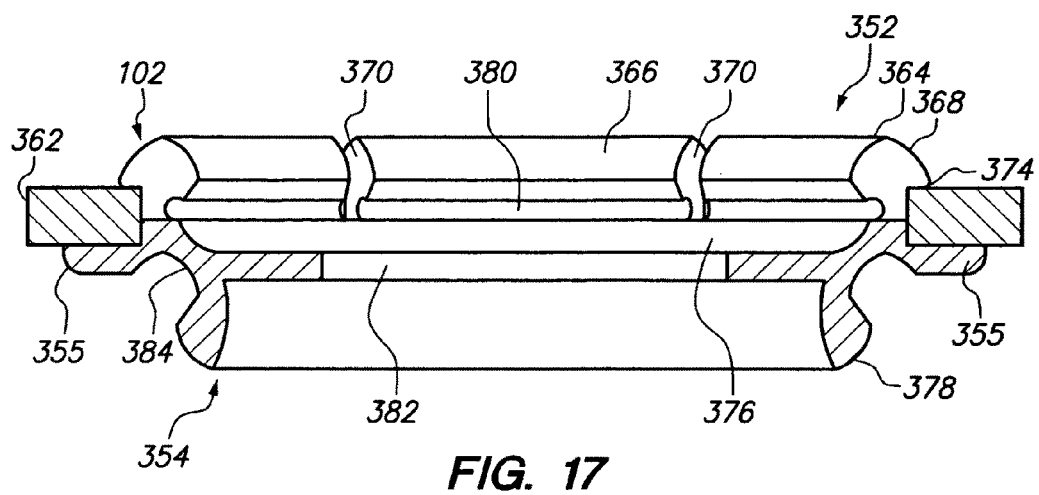
FIG. 17 is a fragmented cross-sectional view of the snap fastener of the toy helmet of FIG. 1 taken along line 17-17 of FIG. 14 showing the female section positioned above the fastener body and the male section positioned below the fastener body, the snap fastener utilized in the inventive method for constructing a product.

Keep in mind that each snap fastener 102 includes both a female section 352 and a male section 354 in the single component construction as shown in FIGS. 13 and 17. The female section 352 functions as the receiving side of the snap fastener 102 to mate with the male section 354 of a second identical snap fastener 102 as shown in FIG. 18. It is understood that each of the identical snap fasteners 102 can mate with any other identical snap fastener 102. That is, the female section 352 of a first snap fastener 356 can mate with the male section 354 of a second identical snap fastener 358, and visa versa, the male section 354 of the first snap fastener 356 can mate with the female section 352 of a third identical snap fastener 360. This feature is clearly shown in FIG. 18 where the three identical snap fasteners 102 have been labeled as first snap fastener 356, second identical snap fastener 358, and third identical snap fastener 360 for clarification purposes. It is further noted that the female side 352 of the snap fastener 102 engages the polypropylene material of the structural elements of the helmet 106 such as, for example, the helmet base 108, comb 240, plume 242, inner visor 140, outer visor trim component 156, inner cheek guards 142, 144, outer cheek guard trim components 152, 154, rear neck guard 146, and the chin strap 340. The polypropylene material of these various structural elements of the helmet 106 are represented by the identification number 362 shown on FIGS. 17 and 18.

Continuing with the description, the female section 352 includes a sloped rim 364 formed around the top perimeter of the snap fastener 102 shown in FIGS. 13-15 and FIGS. 17-18. The sloped rim 364 includes an inner sloped rim 366 shown in FIG. 17 and an outer sloped rim 368 shown in FIG. 13. The sloped rim 364 and particularly the inner sloped rim 366 is the element of the female section 352 of the first snap fastener 356 that interfaces with the male section 354 of the second identical snap fastener 358 as shown in FIG. 18. The interfacing of the inner sloped rim 366 of the first snap fastener 356 with the male section 354 of the second identical snap fastener 358 enables the locking together and separating of the two identical snap fasteners 356 and 358. The sloped rim 364 includes a plurality of slots 370 as shown in FIGS. 13-18 that enable the outer sloped rim 368 of the first snap fastener 356 to converge and expand as necessary when the sloped rim 364 of the first snap fastener 356 interfaces with the male section 354 of the second identical snap fastener 358 as shown in FIG. 18. In the preferred embodiment, six slots 370 are shown equally distributed over the circumference of the sloped rim 364 at approximately sixty-degree increments. However, the number of slots 370 formed in the sloped rim 364 is a function of the application of the snap fastener 102.

Figure 15:
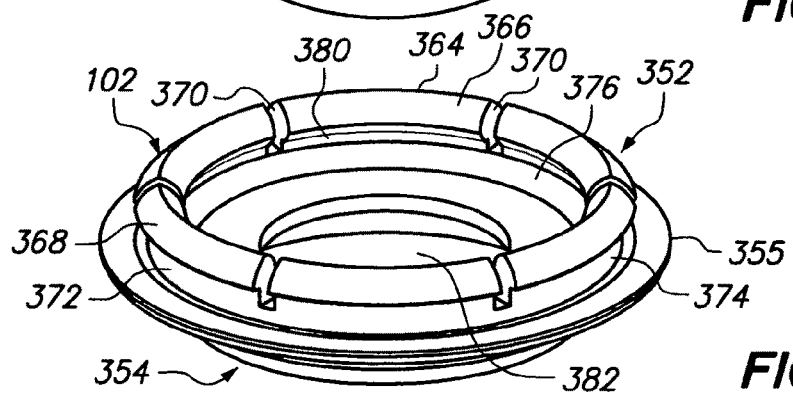
FIG. 15 is a top perspective view of the snap fastener of the toy helmet of FIG. 1 showing the female section of the fastener including the plurality of slots formed within the sloped rim, and a fastener body separating the female section from the male section, the snap fastener utilized in the inventive method for constructing a product.

A top indentation ring 372 best shown in FIGS. 13 and 15 is formed between the sloped rim 364 and the body section 355 and is utilized to receive the polypropylene material 362 to secure the snap fastener 102 in position. The formation of the top indentation ring 372 is facilitated by the outer sloped rim 368. Because of the slots 370, the outer sloped rim 368 is flexible and thus forms a clamping or retaining jaw 374 between the sloped rim 364 and the body section 355 to secure the polypropylene material 362 in position. This design ensures that the snap fastener 102, once installed within the polypropylene material 362, will not be easily removed. In fact, once the polypropylene material 362 engages the box edges of the top indentation ring 372 and is secured by the retaining jaw 374, the polypropylene material 362 is not intended to be removed or separated from the snap fastener 102. Further, an interior indentation ring 376 positioned between the sloped rim 364 and the body section 355 in the female section 352 of the first snap fastener 356 provides an interior cavity for receiving a flexible protuberance 378 of the second identical snap fastener 358 as shown in FIG. 18. This design enables the first snap fastener 356 and the second identical snap fastener 358 to be securely affixed together. However, it is noted that when the flexible protuberance 378 of the second identical snap fastener 358 is positioned within the interior indentation ring 376 of the first snap fastener 356, the two fasteners can be repeatedly engaged and disengaged by the use of force.

It is noted that at the moment that the ring shaped flexible protuberance 378 engages the interior indentation ring 376 of an identical snap fastener 102, the sidewalls of the interior indentation ring 376 are forced outward. This situation causes the retaining jaw 374 of the top indentation ring 372 to increase the grip onto the polypropylene material 362. This result ensures that the snap fastener 102 does not escape from the aperture 112 in the polypropylene material 362 in which the snap fastener 102 is mounted. Likewise, the sidewalls of the interior indentation ring 376 are forced outward in the same manner when the ring shaped flexible protuberance 378 disengages from the interior indentation ring 376. Once again, the retaining jaw 374 of the top indentation ring 372 is caused to increase the grip onto the polypropylene material 362 once again ensuring that the snap fastener 102 does not escape from the aperture 112 that it is mounted in.

Figure 14:
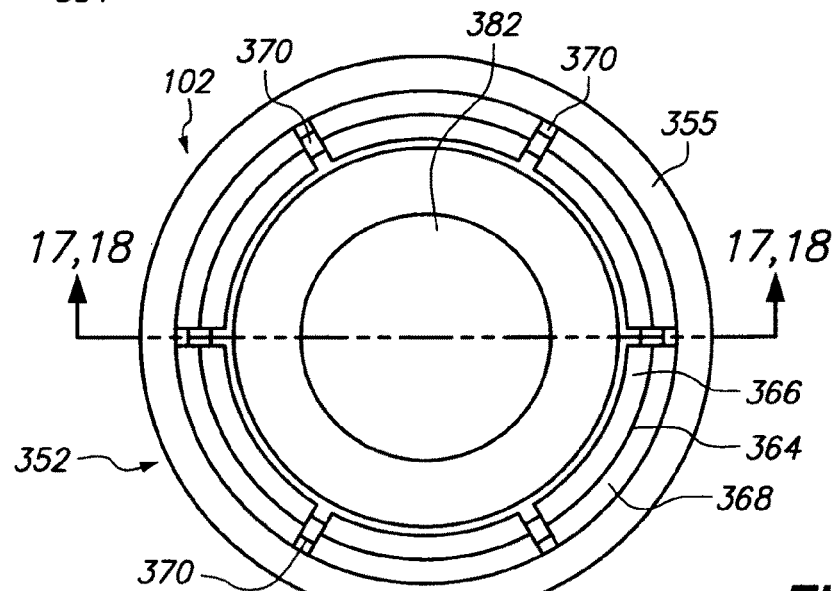
FIG. 14 is a top plan view of the snap fastener of the toy helmet of FIG. 1 showing the female section formed on the upper side of the fastener including a plurality of slots formed within a sloped rim, the snap fastener utilized in the inventive method for constructing a product.

Additionally, a flex groove 380 is a groove formed within the interior indentation ring 376 of the female section 352 shown in FIGS. 14, 17 and 18. The flex groove 380 serves to provide flexibility to the sloped rim 364 when the sloped rim 364 is initially forcibly installed into an aperture 112 formed in the polypropylene material 362. The sloped rim 364 must be inwardly flexible as it is being forced through an aperture 112 formed within the substrate material 362 during the installation or manufacturing phase.

Figure 16:
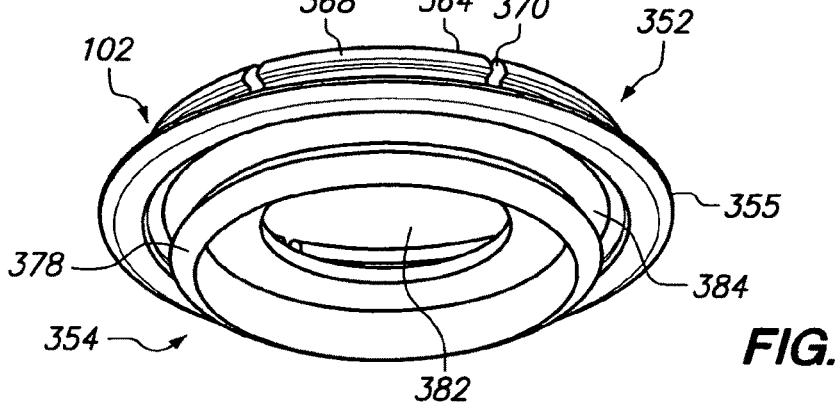
FIG. 16 is a bottom perspective view of the snap fastener of the toy helmet of FIG. 1 showing the male section of the fastener including a flexible protuberance extending below the fastener body, the snap fastener utilized in the inventive method for constructing a product.

The body section 355 shown clearly in FIGS. 13, 15, and 16, and in the cross-sectional views of FIGS. 17-18 serves the following functions. The body section 355 (1) serves as an interface employed to separate the female section 352 from the male section 354 of the snap fastener 102, (2) creates a rigid structure for molding the structural elements of the female section 352 of the snap fastener 102 thereto, and (3) provides structural support to the retaining jaw 374 to secure the polypropylene material 362 in position. The body section 355 is preferably comprised of, for example, polyester or nylon or other suitable material that is sufficiently structurally rigid and strong to support a center penetration 382 there through. The center penetration 382 is formed through the center of the body section 355 of the snap fastener 102 as shown in applicant's FIGS. 14-18. The center penetration 382 serves to eliminate unnecessary polypropylene material 362 in the snap fastener 102 resulting in a lighter weight structure.

The male section 354 of the snap fastener 102 extends downward from the body section 355 as shown in FIGS. 13, 15-16, and 17-18. The flexible protuberance 378 is ring shaped and also extends downward from the body section 355 as can be seen clearly in FIGS. 13 and 16. When the male section 354 of the first snap fastener 356 is engaged with the female section 352 of the third identical snap fastener 360 as shown in FIG. 18, the flexible protuberance 378 of the first snap fastener 356 is fully received by the interior indentation ring 376 of the third identical snap fastener 360. The volume within the male section 354 within the ring shaped flexible protuberance 378 and beneath the center penetration 382 is a void. Only the back side of the ring shaped flexible protuberance 378 of the first snap fastener 356 is visible in the cross-sectional view of FIG. 18. Finally, a bottom indentation ring 384 shown in the male section 354 is formed on the exterior surface of the snap fastener 102 between the body portion 355 and the ring shaped flexible protuberance 378 as shown in FIGS. 13, 16, 17 and 18. The function of the bottom indentation ring 384 of the second identical snap fastener 358 show in FIG. 18 is to receive the inner sloped rim 366 of the first snap fastener 356 to ensure a secure connection between the two fasteners.

It is emphasized that each integrally molded, single-component snap fastener 102 is (1) identical to all other snap fasteners 102 in the present invention, (2) the male section 354 of one snap fastener 102 can repeatedly engage and disengage the interior indentation ring 376 of the female section 352 of another of the identical snap fasteners 102, (3) the interior indentation ring 376 of the female section 352 of one snap fastener 102 can repeatedly engage and disengage the flexible protuberance 378 of the male section 354 of another of the identical snap fasteners 102, and (4) multiple snap fasteners 102 can be connected in a stacked manner as shown in FIG. 4.

Reference has been made to FIGS. 17 and 18 throughout the description of the snap fastener 102. FIG. 17 refers to a single snap fastener 102 and shows the polypropylene material 362 as an element separate from the body section 355. FIG. 17 represents a situation in which the snap fastener 102 is separately and forcibly mounted in an aperture 112 formed in a substrate such as the polypropylene material 362. In the case of FIG. 17, the polypropylene material 362 is positioned in the top indentation ring 372 and secured in position by the retaining jaw 374 as is clearly shown in FIGS. 13 and 18. However, the polypropylene material 362 and the body section 355 shown in FIG. 18 are fused together as shown by the common cross-hatching lines. In the case of FIG. 18, it is evident that the body section 355 of the snap fastener 102 is integrally molded to the polypropylene material 362. Thus, FIG. 18 represents a situation in which the snap fastener 102 is mounted in the aperture 112 formed in the polypropylene material 362 in the manufacturing stage. The snap fastener 102 is typically comprised of a synthetic material such as nylon, polyester, or other suitable material. During the manufacturing phase, the material comprising the snap fastener 102 can be fused to the polypropylene material 362 by any suitable method such as, for example, ultrasonic welding.

Reference is now made to multi-fastener connection tabs 110 as shown in FIGS. 19-24. (I) The six fastener connection tab 180 is shown in FIGS. 19 and 20 and has been described with reference to FIG. 4 above. In FIG. 4, the snap fastener position 314 located at the center of the six fastener connection tab 180 is supported by the other five snap fastener positions 316, 318, 320, 322, and 324. Further, the center snap fastener position 314 functions as the attachment point to support the comb 240 and the plume 242. (ii) One of the three fastener connection tabs is three fastener connection tab 274 shown in FIGS. 2 and 3. A detail view of the three fastener connection tab 274 is illustrated in FIGS. 21 and 22. Three fastener connection tab 274 is utilized to connect three fastener positions together including (1) snap fastener position 102 of the comb 240 and the plume 242 shown in FIGS. 6 and 7, respectively, and (2) snap fastener positions 270, 272 shown in FIG. 5. (iii) One of the two fastener connection tabs is two fastener connection tab 198 shown in FIG. 2. A detail view of the two fastener connection tab 198 is illustrated in FIGS. 23 and 24.

The function of the multi-fastener connection tabs 110 as presented as the exemplary six fastener connection tab 180, three fastener connection tab 274, and two fastener connection tab 198 is to (1) connect to snap fasteners 102 mounted in a plurality of apertures 112, (2) facilitate connections of multiple component parts, and (3) be flexible in construction by utilizing flexible interfaces to assist in component connect and integration. Integration of the snap fastener 102 refers to mounting the snap fasteners 102 into the apertures 112 of the connection tab. The fastener 102 can be fabricated from nylon, polyester or other suitable material and when integrated into the aperture 112, the retaining jaw 374 is what grips and secures the snap fastener 102 in place in the aperture 112. A planar substrate 388 of the connection tabs 110, in general, and in particular connection tabs 180, 274 and 198 shown in FIGS. 19-24, respectively, and also in FIGS. 25-26 is comprised of flexible substrate material such as polypropylene, nylon or polyester. The planar substrate 388 must be flexible and capable of bending, twisting and torquing in order to facilitate the connection between the multi-fastener connection tabs 180, 274, and 198 and any of the plurality of snap fasteners 102 to which it will be connected to accommodate a multiple of spring forces between component parts.

As it relates to the multi-fastener connection tabs 110, each aperture 112 formed in to the flexible planar substrate 388 always has a first snap fastener 102 mounted therein in order to successfully connect to another structural element having a second identical snap fastener 102 mounted therein. This feature is illustrated in FIG. 18 referring to the first snap fastener 356, the second identical snap fastener 358, and the third identical snap fastener 360. If three components are being connected together, the apertures 112 formed in the flexible planar substrate 388 of each component has a snap fastener 102 mounted therein. This design feature carries over to the multi-fastener connection tabs 110 including the exemplary six fastener connection tab 180, the three fastener connection tab 274, and the two fastener connection tab 198.

As an additional feature and further illustration of the method for constructing a product, the present invention includes a matrix 400 of fasteners 102 as shown in FIG. 27. The purpose of the matrix 400 is to provide an auxiliary surface or membrane 402 comprising a pattern of fasteners 102 for attaching articles related to the helmet 106. The construction of the helmet 106 is identical to that previously described in FIGS. 1-26. The auxiliary surface or membrane 402 of the matrix 400 can be comprised of, for example, a vinyl of polypropylene material that is fashioned to be worn over the shoulders (like a poncho) of a person (not shown) wearing the helmet 106. The auxiliary surface 402 comprises a first half 404 and a second half 406 connected together in both the front and rear of the matrix 400. The first half 404 and the second half 406 of the flexible vinyl auxiliary surface 402 includes a corresponding plurality of apertures 112 formed therein and set out in a suitable pattern. As with the construction of the helmet 106, a snap fastener 102 is mounted in each of the apertures 112 as is shown in FIG. 27. The process of engagement and disengagement of the plurality of snap fasteners 102 is exactly the same as previously described herein.

The pattern of snap fasteners 102 as inlaid or mounted in each of the apertures 112 in the first half 404 and the second half 406 of the auxiliary surface 402 is useful in providing an attachment surface for related components. Those related components can include other structures such as, for example, body armor or additional equipment for constructing a product (not shown). The pattern of the fasteners 102 inlaid on the flexible auxiliary surface 402 of the matrix 400 can be modified to be consistent with the product being constructed. Further, the pattern of the matrix 400 of fasteners 102 can be customized to a particular product being constructed. For example, the fasteners 102 mounted on the matrix 400 shown in FIG. 27 do not occupy each and every aperture 112. The matrix 400 serves as a base for enabling any other component having an identical fastener 102 to connect thereto.

The first half 404 and the second half 406 of the auxiliary surface. 402 are connected together on a front surface 408 and a rear surface 410 by a plurality of attachment fasteners 412 and 414, respectively. Both of the plurality of attachment fasteners 412 and 414 are linked together in a linear fashion as shown in FIG. 27. In the preferred embodiment, the related components shown comprise several layers of body armor that physically attach to the auxiliary surface 402 and to adjacent layers of body armor. In particular, the body armor includes a plurality of layers including a first layer 416, a second layer 418, and a third layer 420 positioned on the first half 404 of the auxiliary surface 402. Likewise, the plurality of layers further include a fourth layer 422, a fifth layer 424, and a sixth layer 426 positioned on the second half 406 of the auxiliary surface 402 as shown in FIG. 27. It is noted that each of the layers of armor 416, 418, and 420 attach to the rear surface 410 of the first half 404, and the layers of armor 422, 424, and 426 attach to the rear surface 410 of the second half 406 of the auxiliary surface 402.

Each of the layers of armor including the first layer 416, the second layer 418, the third layer 420 on the first half 404, and the fourth layer 422, the fifth layer 424, and the sixth layer 426 on the second half 406 (1) include a plurality of three separate armor plates 428, where (2) each armor plate 428 includes a plurality of apertures 112 formed therein and a corresponding snap fastener 102 mounted in the apertures 112 as previously described. Furthermore, each of the three separate armor plates 428 in each layer of armor is connected together with a hinge joint 430 as shown in FIG. 27. Each hinge joint 430 is comprised of a two fastener connection tab 432, which is one of the multi-fastener connection tabs 110 described herein above.

Note that the attachment of the layers of armor begin with the layer of armor closest to the end of the shoulder of the auxiliary surface 402. For example, with reference to the first half 404, the outermost first layer 416 is attached and positioned to the snap fasteners 102 directly on the rear surface 410 of the auxiliary surface 402. Then, the second layer of armor 418 is attached to the snap fasteners 102 mounted on the rear surface 410 of the first half 404 of the auxiliary surface 402 but is positioned to partially overlap and attach to the snap fasteners 102 mounted on the first layer of armor 416. Likewise, the third layer of armor 420 is attached to the snap fasteners 102 mounted on the rear surface 410 of the first half 404 but is also positioned to partially overlap and attach to the snap fasteners 102 mounted on the second layer of armor 418. Now, with reference to the second half 406 of the auxiliary surface 402, the outermost sixth layer 426 is attached and positioned to the snap fasteners 102 directly on the rear surface 410 of the auxiliary surface 402. Next, the fifth layer of armor 424 is attached to the snap fasteners 102 mounted on the rear surface 410 of the second half 406 of the auxiliary surface 402 but is positioned to partially overlap and attach to the snap fasteners 102 mounted on the sixth layer of armor 426. Likewise, the fourth layer of armor 422 is attached to the snap fasteners 102 mounted on the rear surface 410 of the second half 406 of the auxiliary surface 402 but is also positioned to partially overlap and attach to the snap fasteners 102 mounted on the fifth layer of armor 424.

It is also noted that the multiple layers of armor including the first layer 416, second layer 418, third layer 420 of the first half 404 of the auxiliary surface 402 can attach to one another via the snap fasteners 102 associated with the two fastener connection tabs 432. Likewise, the multiple layers of armor including the fourth layer 422, fifth layer 424, and the sixth layer 424 of the second half 406 of the auxiliary surface 402 can also attach to one another via the snap fasteners 102 of the two fastener connection tabs 432. As an illustration of the alignment process, reference is again made to the third layer of armor 420 located on the first half 404 which is shown unsnapped and raised above the auxiliary surface 402 for illustration purposes. Note the pair of alignment lines including a first alignment line 436 and a second alignment line 438 passing through an adjacent pair of apertures 112 in the third layer of armor 420. Also note that the second alignment line 438 terminates at an aperture 112 located on the first half 404 of the auxiliary surface 402 while the first alignment line 436 terminates at an aperture 112 formed in the second layer of armor 418. Once again, this illustrates that the separate layers of armor 416, 418 and 420 of the first half 404 of the auxiliary surface 402 overlap one another, and that the separate layers of armor 422, 424, and 426 of the second half 406 of the auxiliary surface 402 also overlap one another.

The main point is that the related components, such as the body armor, can be layered so that the different layers of armor 316, 318, 320, and 322, 324 and 326 can be positioned over the underlying auxiliary surface 402 comprised of the flexible vinyl or polypropylene material by employing the matrix 400 of apertures 112 and inlaid snap fasteners 102. Each different layer of armor can be attached to the auxiliary surface 102 or to a preceding layer of armor by the corresponding snap fasteners 102 mounted in the apertures 112 in each layer of armor. This design is very similar to the stacking of the snap fasteners 102 as illustrated in FIG. 18 described herein. In this manner, each layer of armor can be stacked on one or more preceding layers of armor via the snap fasteners 102. The snap fasteners 102 inlaid in the underlying auxiliary surface 402 comprised of the flexible vinyl or polypropylene material serve as an attachment base for other overlying layers of armor. The snap fasteners 102 of each additional layer of armor serves as an attachment point for the next overlying layer of armor.

An additional feature of the matrix 400 includes a second flexible matrix layer 440 shown in FIG. 27. The second flexible matrix layer 440 is an extension of the auxiliary surface 402 comprised of, for example, vinyl or polypropylene material and having a pattern of apertures 112 with snap fasteners 102 mounted therein. The shape of the second flexible matrix layer 440 can be selected as desired just as with the pattern of snap fasteners 102. In the preferred embodiment shown in FIG. 27, the second flexible matrix layer 440 is shown as being rectangular. Because the snap fasteners 102 inlaid in the second flexible matrix layer 440 are identical to the snap fasteners 102 utilized in the auxiliary surface 402 of the matrix 400, the second flexible matrix layer 440 can easily engage and disengage from the matrix 400. Further, multiple flexible matrix layers 440 can be attached to the matrix 400 and to preceding flexible matrix layers 440 in a stacking manner using the inlaid snap fasteners 102 as previously described in FIG. 18. The utility of the second flexible matrix layer 440 is that it serves to (1) provide an extended surface to add additional layers of armor, and (2) to provide additional surfaces to attach other structural components as needed.

The overall utility of the fastener matrix 400 includes (1) the auxiliary surface 402, including the snap fasteners 102 inlaid in the apertures 112, of the matrix 400 provides multiple positions to connect additional layers of structure such as, for example, the armor plates 428 and the second flexible matrix layer 440, (2) the fastener matrix 400 can be designed to be useful in assembling the structural components of multiple products 100, and (3) the flexible vinyl or polypropylene material comprising the auxiliary surface 402 of the fastener matrix 400 can exhibit any shape or size and can be utilized with other components attached to the matrix 400 for constructing a product 100.

When auxiliary component parts are fastened to the flexible matrix 400, or when the second flexible matrix layer 440 (or an equivalent additional matrix layer) is fastened to the flexible matrix 400, and each of the additional matrix layers exhibit a pattern of fasteners 102 similar to that of matrix 400, certain characteristics exist. The second flexible matrix layer 440 (or the equivalent additional matrix layer) is simple to align with the flexible matrix 400 and does not require any additional force greater than the force required to attach a first snap fastener 102 to a second identical snap fastener 102. However, it is noted that the repeated act of fastening the total number of individual snap fasteners 102 associated with the additional matrix layers must be achieved. When a tensile force is applied, the matrix of fasteners 400 and the second flexible matrix layer 440 (or additional flexible matrix layer)

displays a greater cumulative resistance to separation of the snap fasteners 102. In other words, a greater combined resistance to separation is experienced with the matrix of fasteners 400 than with the summation of the resistance of the individual snap fasteners 102 combined. This combined resistance experienced with the matrix of fasteners 400 is caused by the distribution of the applied tensile force over the total number of snap fasteners 102 in the matrix layers.

The cumulative resistance of the snap fasteners 102 of the matrix 400 remains high all the way until the point of failure is reached, or in this case, until disengagement of the snap fasteners 102. That is, a gradual reduction of the resistance of the snap fasteners 102 of the matrix 400 is not displayed prior to the disengagement of the snap fasteners 102 which provides a predictable point at which disengagement occurs. Further, the snap fasteners 102 of the matrix 400 are resistant to separation when in the static state but the snap fasteners 102 quickly disengage once a sufficient separation force is applied pulling the layers apart, e.g., matrix 400 and the second flexible matrix layer 440. However, when fully attached and engaged, the layers of the matrix 400 and the second flexible matrix layer 440 can withstand high tensile forces. Additionally, the component parts of the different matrix surface layers, e.g., the matrix 400 and the second flexible matrix layer 440 (or other additional equivalent matrix layer), can conform to any shaped surface area. The above recited characteristics would be useful for: (1) emergency devices that are required to release and be accessible under certain conditions, such as, for example, emergency fire fighting equipment; (2) for fastening together, materials that are difficult to adhere one to the other, such as, for example, ceramic and rubber materials; and (3) useful for attaching different substances together that have congruent patterns of snap fastener 102.

The present invention discloses a method for constructing a product 100 where the method comprises the steps of providing a plurality of component parts for a product 100 fashioned from a substrate material 362 having flexible, spring-like properties where each of the component parts exhibits a flat profile in a disassembled state. The next step includes the forming of a plurality of apertures 112 in each of the component parts for establishing a plurality of fastening points for facilitating the assembly of the product, where each of the apertures 112 has a single-component snap fastener 102 mounted therein. The next step involves integrally molding each of the single-component snap fasteners 102 to include a female section 352 and a male section 354. The next step includes assembling each of the component parts of the product 100 by removably affixing the male sections 354 of the snap fasteners 102 mounted within a first of the component parts stackably with the female sections 352 of the snap fasteners 102 mounted within a second of the component parts, to form a self-supporting, three-dimensional exoskeleton 104 of the product 100 having flexibly curved surfaces 118. Finally, the method includes returning the plurality of component parts to the flat profile upon disengagement of the snap fasteners 102 from the product 100.

The present invention also discloses an integrally molded, single-component snap fastener 102 comprising a female section 352 and a male section 354, each integrally molded to and supported by a fastener body 355. The female section 352 includes a ring-shaped sloped rim 364 that includes a plurality of slots 370 for providing flexibility to the sloped rim 364 where the sloped rim 364 defines an interior indentation ring 376. A top indentation ring 372 is formed between the sloped rim 364 and the fastener body 355 for defining a retaining jaw 374 for clamping to a substrate material 362 when the sloped rim 364 is inserted through an aperture 112 formed in the substrate material 362. Finally, the male section 354 includes a ring-shaped protuberance 378 extending from the fastener body 355 where the ring shaped protuberance 378 defines a bottom indentation ring 384. The combination of the female section 352, the male section 354 and the fastener body 355 forms a first single-component snap fastener 102, where the first snap fastener 102 is stackably engageable and disengageable with a second identical snap fastener 102.

The present invention provides novel advantages over other methods for constructing a product and the fastening devices used therewith. A main advantage of the method for constructing a product and fastener therefor is that: (1) the product 100 is comprised of multiple components where each component is fashioned in a preferred pattern having a flat profile when unassembled which is convenient for storage and transport; (2) the product 100 is fabricated from a flexible substrate material such as polypropylene material 362; (3) the polypropylene material 362 has spring-like properties that retain the memory of the original flat profile of the components; (4) where the design employs a plurality of apertures 112, fold lines 114, and stress release holes 116 for enabling the helmet base 108 to be formed into a desired shape; (5) the product 100 is assembled with a plurality of integrally-molded, single component snap fasteners 102; (6) to form a three dimensional, self supporting flexible exoskeleton structure 104 having flexible curved surfaces generated by the stress applied to the polypropylene material; (7) which when disassembled, the components of the three-dimensional, self-supporting flexible exoskeleton structure 104 revert back to the flat profile suitable for storage or transporting in a carrying case; (8) once assembled, the three dimensional flexible exoskeleton structure 104 if deformed, can recover the original shape of the structure if manually assisted because of the spring characteristics of the polypropylene; (9) where each single component snap fastener 102 is identical and includes a female section 352 and a male section 354 separated by a body section 355; (10) where each snap fastener 102 is capable of repeatedly engaging and disengaging with the female section 352 or the male section 354 of any other identical snap fastener 102; (11) where the assembly of the product 100 in accordance with the method teaches direct contact, serial building of components on one another by stacking the snap fasteners 102 integrated into the plurality of layered components; (12) where multi-fastener connection tabs 110 having multiple appendages with corresponding snap fasteners 102 mounted therein are employed to enable the attachment of several components to a single location; and finally (13) the use of a fastener matrix 400 associated with helmet 106 provides a fastener surface for attaching auxiliary component parts thereto; (14) the method of the present invention being useful for constructing a plurality of products 100 including the exemplary helmet 106, or an emergency arm brace, or the design of furniture, or an exterior vehicle body, or other useful items.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. A method for constructing a product, said method comprising the steps of:
   providing a plurality of component parts of a product fashioned from a substrate material having flexible, spring-like properties, each component part having a flat profile in a disassembled state;
   forming a plurality of apertures in each of said component parts to establish a corresponding plurality of fastening points for facilitating assembly of said product, each of said apertures having a single-component snap fastener mounted therein;
   integrally molding each of said single-component snap fasteners to include a female section and a male section, each integrally molded to and supported by a fastener body;
   assembling each of said component parts of said product by removably affixing said male section of a first of said snap fasteners mounted within a first of said component parts stackably with said female section of a second of said snap fasteners mounted within a second of said component parts to secure together said first and said second component parts, to form a self-supporting, three-dimensional exoskeleton of said product having flexibly curved surfaces, each of said single-component snap fasteners being stackably engageable and disengageable with at least two of said single-component snap fasteners; and
   returning said plurality of component parts to said flat profile upon disengaging said snap fasteners.

2. A method for constructing a helmet, said method comprising the steps of:
   providing a helmet base comprising a plurality of segments each formed on a sheet of flat, flexible material having spring-like properties;
   modifying said helmet base to include a plurality of apertures, fold lines and stress release holes for enabling said helmet base to be formed into a desired shape;
   manipulating said sheet of flat, flexible material to form a ring shape and to position each of said segments to be affixed to a first multi-fastener connection tab, for forming a three-dimensional exoskeleton of a helmet; and
   mounting an integrally formed, single-component snap fastener within each of said apertures for facilitating assembly of said helmet, each of said snap fasteners having a male section mounted within a first sheet of flat, flexible material and a female section mounted within a second sheet of flat, flexible material for stackably engaging and disengaging a first and a second of said snap fasteners to secure together said first and said second sheets of flat, flexible material.

3. The method of claim 2 further including the step of mounting a decorative plume on said helmet base and affixing said plume to said first multi-fastener connection tab.

4. The method of claim 2 further including the step of mounting a rear neck guard on said helmet base with at least a second multi-fastener connection tab.

5. The method of claim 2 further including the step of mounting a visor to said helmet base with said snap fasteners.

6. The method of claim 2 further including the step of mounting a pair of cheek guards to said helmet base with said snap fasteners.

7. The method of claim 2 further including the step of providing an adjustable chin strap affixed to said helmet base with said snap fasteners, said chin strap comprising a first strap and a second strap, each including a plurality of apertures with said snap fasteners mounted therein for providing adjustability to said chin strap.

8. The method of claim 2 further including the step of providing a flexible fastener matrix layer having a plurality of single-component snap fasteners mounted thereon for providing a surface for attaching auxiliary layers of component parts.

9. A method for constructing a product, said method comprising the steps of:
   providing a plurality of segments each formed on a common sheet of flat, flexible material having spring-like properties;
   modifying said sheet of flat, flexible material to include a plurality of apertures, fold lines and stress release holes for enabling said sheet of flat, flexible material to be formed into a desired shape;
   manipulating said sheet of flat, flexible material to form said desired shape and to position each of said segments to be affixed to a multi-fastener connection tab, for forming a three-dimensional exoskeleton of a product; and
   mounting an integrally formed, single-component snap fastener within each of said apertures for facilitating assembly of said product, each of said snap fasteners having a male section mounted within a first sheet of flat, flexible material and a female section mounted within a second sheet of flat, flexible material for stackably engaging and disengaging a first and a second of said snap fasteners to secure together said first and said second sheets of flat, flexible material.

* * * * *

UNITED STATES PATENT AND TRADEMARK OFFICE
CERTIFICATE OF CORRECTION

PATENT NO.         : 8,567,021 B2                                          Page 1 of 1
APPLICATION NO.    : 12/658685
DATED              : October 29, 2013
INVENTOR(S)        : Stephen O. McCabe It is certified that error appears in the above-identified patent and that said Letters Patent is hereby corrected as shown below:

In the Claims:

Column 30, Claim 9, line 3, delete the text "com-"; and
Claim 9, line 4, delete the text "mon".

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,567,021 B2  Page 1 of 1
APPLICATION NO. : 12/658685
DATED : October 29, 2013
INVENTOR(S) : Stephen O. McCabe It is certified that error appears in the above-identified patent and that said Letters Patent is hereby corrected as shown below:

In the Claims:

Column 30, Claim 9, line 28, delete the text "com-"; and
Claim 9, line 29, delete the text "mon".

This certificate supersedes the Certificate of Correction issued September 2, 2014.

Signed and Sealed this
Twenty-third Day of September, 2014

Michelle K. Lee
*Deputy Director of the United States Patent and Trademark Office*